US008457959B2

(12) United States Patent
Kaiser

(10) Patent No.: US 8,457,959 B2
(45) Date of Patent: Jun. 4, 2013

(54) SYSTEMS AND METHODS FOR IMPLICITLY INTERPRETING SEMANTICALLY REDUNDANT COMMUNICATION MODES

(76) Inventor: Edward C. Kaiser, Seattle, WA (US)

( * ) Notice: Subject to any disclaimer, the term of this patent is extended or adjusted under 35 U.S.C. 154(b) by 1069 days.

(21) Appl. No.: 12/040,752

(22) Filed: Feb. 29, 2008

(65) Prior Publication Data

US 2008/0221893 A1    Sep. 11, 2008

Related U.S. Application Data

(60) Provisional application No. 60/892,500, filed on Mar. 1, 2007.

(51) Int. Cl.
*G10L 15/00* (2006.01)

(52) U.S. Cl.
USPC ............................ 704/231; 704/236; 704/270

(58) Field of Classification Search
USPC .................................................. 704/231, 270
See application file for complete search history.

(56) References Cited

U.S. PATENT DOCUMENTS

| | | | |
|---|---|---|---|
| 5,524,172 A | | 6/1996 | Hamon |
| 5,729,741 A * | | 3/1998 | Liaguno et al. ........................ 1/1 |
| 5,745,873 A * | | 4/1998 | Braida et al. ................... 704/222 |
| 6,205,261 B1 * | | 3/2001 | Goldberg ...................... 382/310 |
| 6,292,857 B1 * | | 9/2001 | Sidoroff et al. .................... 710/54 |
| 7,225,131 B1 * | | 5/2007 | Bangalore et al. ............. 704/270 |
| 7,337,116 B2 * | | 2/2008 | Charlesworth et al. ....... 704/254 |
| 2002/0032566 A1 * | | 3/2002 | Tzirkel-Hancock et al. . 704/241 |
| 2002/0135618 A1 | | 9/2002 | Maes et al. |
| 2003/0187643 A1 | | 10/2003 | Van Thong et al. |
| 2004/0071344 A1 * | | 4/2004 | Lui et al. ........................ 382/181 |
| 2004/0093220 A1 * | | 5/2004 | Kirby et al. .................... 704/278 |
| 2004/0193428 A1 * | | 9/2004 | Fruchter et al. ............... 704/276 |
| 2005/0048450 A1 | | 3/2005 | Winkler |
| 2005/0065777 A1 * | | 3/2005 | Dolan et al. ..................... 704/10 |
| 2005/0096914 A1 * | | 5/2005 | Williamson et al. .......... 704/277 |
| 2005/0128181 A1 * | | 6/2005 | Wang et al. .................... 345/156 |
| 2005/0197843 A1 * | | 9/2005 | Faisman et al. ............... 704/276 |
| 2005/0203738 A1 * | | 9/2005 | Hwang .......................... 704/243 |
| 2007/0150275 A1 * | | 6/2007 | Garner et al. ................. 704/235 |
| 2008/0082329 A1 * | | 4/2008 | Watson .......................... 704/235 |
| 2008/0195931 A1 * | | 8/2008 | Raghupathy et al. ......... 715/230 |

OTHER PUBLICATIONS

Ahn, L. v. Games with a purpose. IEEE Computer Magazine 39, 6 (2006), 92-94.

(Continued)

*Primary Examiner* — Douglas Godbold
(74) *Attorney, Agent, or Firm* — Richard C. Vershave; Foster Pepper, PLLC

(57) ABSTRACT

New language constantly emerges from complex, collaborative human-human interactions like meetings—such as when a presenter handwrites a new term on a whiteboard while saying it redundantly. The system and method described includes devices for receiving various types of human communication activities (e.g., speech, writing and gestures) presented in a multimodally redundant manner, includes processors and recognizers for segmenting or parsing, and then recognizing selected sub-word units such as phonemes and syllables, and then includes alignment, refinement, and integration modules to find or at least an approximate match to the one or more terms that were presented in the multimodally redundant manner. Once the system has performed a successful integration, one or more terms may be newly enrolled into a database of the system, which permits the system to continuously learn and provide an association for proper names, abbreviations, acronyms, symbols, and other forms of communicated language.

18 Claims, 29 Drawing Sheets

OTHER PUBLICATIONS

Ahn, L. v., Liu, R., and Blum, M. Peekaboom: A game for locating objects in images. In ACM CHI 2006.

Allauzen, A., and Gauvain, J.-L. Open vocabulary asr for audiovisual document indexation. In ICASSP '05 (Philadelphia, 2005).

AMI. Augmented multi-party interaction (http://www.amiproject.org/).

Anderson, R., Hoyer, C., Prince, C., Su, J., Videon, F., and Wolfman, S. Speech, ink and slides: The interaction of content channels. In ACM Multimedia (2004).

Anderson, R J., Anderson, R., Hoyer, C., and Wolfman, S. A. A study of digital ink in lecture presentation. In CHI 2004: The 2004 Conference on Human Factors in Computing Systems (Vienna, Austria, 2004).

Arnon, A., Alon, E., and Srinivasan, S. Advances in phonetic word spotting. In Tenth International Conference on Information and Knowledge Management (Atlanta, Georgia, 2001), pp. 580-582.

Atkeson, C. G., Hale, J. G., Pollick, F., Riley, M., Kotosaka, S., Schaal, S., Shibata, T., Tevatia, G., Ude, A., Vijayakumar, S., and Kawato, M. Using humanoid robots to study human behavior. IEEE Intelligent Systems 16, 4 (2000), 46-56.

Baeza-Yates, R., and Ribeiro-Neto, B. Modern Information Retrieval. Addison-Wesley, 1999.

Baird, J. A., and Baldwin, D. A. Making sense of human behavior: Action parsing and intentional inference. In Intentions and Intentionality, B. F. Malle, L. J. Moses, and D. A. Baldwin, Eds. MIT Press, Cambridge, MA., 2001, pp. 193-206.

Barthelmess, P., Kaiser, E. C., Huang, X., and Demirdjian, D. Distributed pointing for multimodal collaboration over sketched diagrams. In The Seventh International Conference on Multimodal Interfaces (ICMI '05) (Trento, Italy, 2005).

Barthelmess, P., Kaiser, E. C., Huang, X., McGee, D., and Cohen, P. Collaborative multimodal photo annotation over digital paper. In Eighth International Conference on Multimodal Interfaces (ICMI06), to appear (Banff, Canada, 2006).

Bates, R. Speaker Dynamics as a Source of Pronunciation Variability for Continuous Speech Recognition Models. PhD thesis, University of Washington, 2003.

Black, A. W., and Lenzo, K. A. Flite: a small fast run-time synthesis engine. In The 4th ISCA Workshop on Speech Synthesis (Perthshire, Scotland, 2001).

Breazeal, C., Brooks, A., Gray, J., Hoffman, G., Kidd, C., Lee, H., Lieberman, J., Lockerd, A., and Mulanda, D. Humanoid robots as cooperative partners for people. International Journal of Humanoid Robots (Forthcoming) 1,2 (2004).

Breazeal, C., Hoffman, G., and Lockerd, A. Teaching and working with robots as a collaboration. In Third International Joint Conference on Autonomous Agents and Multiagent Systems (AAMAS '04) (New York, 2004), vol. 3, pp. 1030-1037.

Burget, L., Cernock, J., Fapso, M., Karafit, M., Matejka, P., Schwarz, P., Smrz, P., and Szke, I. Indexing and search methods for spoken documents. In Proceedings of the Ninth International Conference on Text, Speech and Dialogue, TSD '06 (Berlin, DE, 2006), pp. 351-358.

CALO. http://www.ai.sri.com/project/calo.

Cangelosi, A. Evolution of communication and language using signals, symbols, and words. IEEE Transactions on Evolutionary Computation 5,2 (2001), 93-101.

Cangelosi, A., Greco, A., and Harnad, S. From robotic toil to symbolic theft: Grounding transfer from entry-level to higher-level categories. Connection Science 12 (2000), 143-162.

Porzel et al., "Towards Context-adaptive Natural Language Processing Systems," European Media Laboratory GmbH, pp. 1-12. 2002.

Carletta, J., Ashby, S., Bourban, S., Flynn, M., Guillemot, M., Hain, T., Kadlec, J., Karaiskos, V., Kraaij, W., Kronenthal, M., Lathoud, G., Lincoln, M., Lisowska, A., McCowan, I., Post, W., Reidsma, D., and Wellner, P. The ami meeting corpus: A pre-announcement. In 2nd Joint Workshop on Multimodal Interaction and Related Machine Learning Algorithms (Edinburgh, UK, 2005).

Carletta, J. C. Assessing agreement on classification tasks: the kappa statistic. Computational Linguistics 22, 2 (1996), 249-254.

CHIL. Chil—computers in the human interaction loop (http://chil.server.de/servlet/is/101/).

Chung, G., Seneff, S., Wang, C., and Hetherington, L. A dynamic vocabulary spoken dialogue interface. In Interspeech '04 (Jeju Island, Korea, 2004), pp. 327-330.

Chung, G., Wang, C., Seneff, S., Fllisko, E., and Tang, M. Combining linguistic knowledge and acoustic information in automatic pronunciation lexicon generation. In Interspeech '04 (Jeju Island, Korea, 2004), pp. 328-332.

Clark, H. H., and Wilkes-Gibbs, D. Referring as a collaborative process. Cognition 22 (1986), pp. 1-39.

Cohen, P., Johnston, M., McGee, D., Oviatt, S., Pittman, J., Smith, I., Chen, L., and Clow, J. Quickset: Multimodal interaction for distributed applications. In International Multimedia Conference (1997), pp. 31-40.

Cohen, P. R., Johnston, M., McGee, D., Oviatt, S., Pittman, J., Smith, I., Chen, L., and Clow, J. Quickset: multimodal interaction for simulation setup and control. In Proceedings of the fifth conference on Applied natural language processing (1997).

CSLU. http://cslu.cse.ogi.edu/toolkit/index.html.

Demirdjian, D., Ko, T., and Darrell, T. Constraining human body tracking. In Proceedings of the International Conference on Computer Vision (Nice, France, 2003), pp. 1071-1078.

Dhande, S. S. A Computational Model to Connect Gestalt Perception and Natural Language. Master of science on media arts and sciences, Massachusetts Institute of Technology, 2003.

Fellbaum, C., Ed. WordNet: An Electronic Lexical Database. MIT Press, Boston, 1998.

Filali, K., and Bilmes, J. A dynamic bayesian framework to model context and memory in edit distance learning: An application to pronunciation classification. In Proceedings of the Association for Computational Linguistics (ACL) (University of Michigan, Ann Arbor, 2005).

Franklin, D., and Hammond, K. The intelligent classroom: Providing competent assistance. In in Proceedings of International Comference on Autonomous Agents (Agents—2001).

Furnas, G., Landauer, T., Gomez, L., and Dumais, S. T. The vocabulary problem in human-system communication. Communications of the Association for Computing Machinery 30, 11 (1987), 964-971.

Garofolo, J., Auzanne, G., and Voorhees, E. The trec spoken document retrieval track: A success story. In RAIO—2000: ContentBased Multimedia Information Access Conference (Paris, France, 2000), vol. 1, pp. 1-20.

Glass, J., Hazen, T. J., Hetherington, L., and Wang, C. Analysis and processing of lecture audio data: Preliminary investigations. In HLT-NAACL Workshop on Interdisciplinary Approaches to Speech Indexing and Retrieval (2004).

Gorniak, P., and Roy, D. K. Augmenting user interfaces with adaptive speech commands. In in Proceedings of the International Conference for Multimodal Interfaces (Vancouver, B.C., Canada, 2003), pp. 176-179.

Grice, H. P. Logic and conversation. In Speech Acts, P. Cole and J. Morgan, Eds. Academic Press, New York, 1975, pp. 41-58.

Hansen, J. H., Huang, R., Mangalath, P., Zhou, B., Seadle, M., and John. R. Deller, J. Speechfind: Spoken document retrieval for a national gallery of the spoken word. In Proceedings of the 6th Nordic Signal Processing Symposium—NORSIG 2004 (Espo, Finland, 2004).

Harnad, S. The symbol grounding problem. Physica D 42 (1990), 335-346.

Hoffman, G., and Breazeal, C. Robots that work in collaboration with people. In CHI 2004 Workshop on Shaping Human Robot Interaction (Vienna, 2004).

Hu, H., Li, J., Walter, B., and Chang, E. Spoken query for web search and navigation. In Poster Proceedings, Tenth International World-Wide Web Conference (2001).

Johnston, M. Unification-based multimodal parsing. In Proceedings of COLINGACL 98: The 17th International Conference on Computational Linguistics and the 36th Annual Meeting of the Association for Computational Linguistics (Montreal, Canada, 1998).

Johnston, M., and Bangalore, S. Matchkiosk: A multimodal interactive city guide. In Association of Computational Linguistics (ACL2004) (Barcelona, Spain, 2004).

Johnston, M., Cohen, P. R., McGee, D., Oviatt, S. L., Pittman, J. A., and Smith, I. Unification-based multimodal integration. In Proceedings of the 35th Annual Meeting of the Association for Computational Linguistics (1997), Association for Computational Linguistics Press.

Jones, G. J. F., Foote, J. T., Jones, K. S., and Young, S. J. Retrieving spoken documents by combining multiple index sources. In Proceedings of the Nineteenth Annual International ACM SIGIR Conference on Research and Development in Information Retrieval (Zurich, Switzerland, 1996), pp. 30-38.

Kaiser, E. Robust, finite-state parsing for spoken language. In Student Session of ACL '99 (College Park, Maryland, 1999).

Kaiser, E., Demirdjian, D., Gruenstein, A., Li, X., Niekrasz, J., Wesson, M., and Kumar, S. Demo: A multimodal learning interface for sketch, speak and point creation of a schedule chart. In International Conference on Multimodal Interfaces (ICMI '04) (State College, PA., 2004), pp. 329-330.

Kaiser, E., Johnston, M., and Heeman, P. A. Profer: Predictive, robust finite-state parsing for spoken language. In Proceedings of ICASSP (1999), vol. 2, pp. 629-632.

Kaiser, E. C. Can modeling redundancy in multimodal, multi-party tasks support dynamic learning? In CHI 2005 Workshop: CHI Virtuality 2005 (Portland, OR., USA, 2005).

Kaiser, E. C. Multimodal new vocabulary recognition through speech and handwriting in a whiteboard scheduling application. In Proceedings of the International Conference on Intelligent User Interfaces (San Diego, CA., 2005), pp. 51-58.

Kaiser, E. C. Shacer: a speech and handwriting recognizer. In Workshop Proceedings of the Seventh International Conference on Multimodal Interfaces (ICMI 2005), Workshop on Multimodal, Multiparty Meeting Processing (Trento, Italy, 2005).

Kaiser, E. C., and Barthelmess, P. Edge-splitting in a cumulative multimodal system, for a no-wait temporal threshold on information fusion, combined with an under-specified display. In Ninth International Conference on Spoken Language Processing (Interspeech 2006—ICSLP), to appear (Pittsburgh, PA, 2006).

Kaiser, E. C., Barthelmess, P., and Arthur, A. Multimodal play back of collaborative multiparty corpora. In Workshop Proceedings of the Seventh International Conference on Multimodal Interfaces (ICMI 2005), Workshop on Multimodal, Multiparty Meeting Processing (Trento, Italy, 2005).

Kaiser, E. C., Barthelmess, P., Huang, X., and Demirdjian, D. A demonstration of distributed pointing and referencing for multimodal collaboration over sketched diagrams. In Workshop Proceedings of the Seventh International Conference on Multimodal Interfaces (ICMI 2005), Workshop on Multimodal, Multiparty Meeting Processing (Trento, Italy, 2005).

Ko, T., Demirdjian, D., and Darrell, T. Untethered gesture acquistion and recognition for a multimodal conversational system. In Fifth International Conference on Multimodal Interfaces, ICMI '03 (Vancouver, B.C., Canada, 2003), pp. 147-150.

Kara, L. B., and Stahovich, T. F. An image-based trainable symbol recognizer for sketch-based interfaces. In AAAI Fall Symposium Series 2004: Making Pen-Based Interaction Intelligent and Natural (Arlington, Virginia, 2004).

Zhou, Z., Yu, P., Chelba, C., and Seide, F. Towards spoken document retrieval for the Internet: Lattice indexing for large scale web search architectures. In Human Language Technology Conference / North American chapter of the Association for Computational Linguistics Annual Meeting (New York City, 2006).

Kondrak, G. A new algorithm for the alignment of phonetic sequences. In Proceedings of the First Meeting of the North American Chapter of the Association for Computational Linguistics (ANLP-NAACL) (Seattle, WA., 2000), pp. 288-295.

Kondrak, G., and Sherif, T. Evaluation of several phonetic similarity algorithms on the task of cognate identification. In COLING-ACL (Sydney, Australia, 2006), pp. 43-50.

Kumar, S., Cohen, P. R., and Levesque, H. J. The adaptive agent architecture: Achieving fault-tolerance using persistent broker teams. In in Proceedings of the Fourth International Conference on Multi-Agent Systems (ICMAS 2000) (Boston, MA., USA., 2000), pp. 159-166.

Kurihara, K., Goto, M., Ogata, J., and Igarashi, T. Speech pen: Predictive handwriting based on ambient multimodal recognition. In Proceedings of the SIGCHI Conference on Human Factors in Computing Systems (Montral, Qubec, Canada, 2006), pp. 851-860.

Landay, J. A., and Myers, B. A. Sketching interfaces: Toward more human interface design. IEEE Computer 34, 3 (2001), 56-64.

Larkey, L., AbdulJaleel, N., and Connell, M. What's in a name?: Proper names in arabic cross language information retrieval. Tech. rep., Department of Computer Science, University of Massachusetts Amherst, 2003.

Leath, T. Audient: An acoustic search engine. Tech. rep., University of Ulster, 2005.

M4. Multimodal meeting manager (http://www.m4project.org/).

Malle, B. F., Moses, L. J., and Baldwin, D. A. Introduction: The significance of intentionality. In Intentions and Intentionality: Foundations of Social Cognition, B. F. Malle, L. J. Moses, and D. A. Baldwin, Eds. MIT Press, Cambridge, Mass., 2001, pp. 1-27.

Mayer, R. E., and Moreno, R. Nine ways to reduce cognitive load in multimedia learning. Educational Psychologist 38, 1 (2003), 43-52.

Zue, V., Seneff, S., Glass, J., Polifroni, J., Pao, C., Hazen, T. J., and Hetherington, L. Jupiter: A telephone-based conversational interface for weather information. IEEE Transactions on Speech and Audio Processing 8, 1 (2000).

Meliani, R. E., and O'Shaughnessy, D. New efficient fillers for unlimited word recognition and keyword spotting. In ICSLP '96 (Philadelphia, Pennsylvania, USA, 1996).

Mooney, R. J. Learning language from perceptual context: A challenge problem for ai. In AAAI Fellows Symposium (Boston, MA., 2006).

Moreau, N., Jin, S., and Sikora, T. Comparison of different phone-based spoken document retrieval methods with text and spoken queries. In Interspeech'2005-Eurospeech (Lisbon, Portugal, 2005).

Moreau, N., Kim, H., and Sikora, T. Phonetic confusion based document expansion for spoken document retrieval. In SIGIR (2004).

Morgan, N., Baron, D., Bhagat, S., Carvey, H., Dhillon, R., Edwards, J., Gelbart, D., Janin, A., Krupski, A., Peskin, B., Pfau, T., Shriberg, E., Stolcke, A., and Wooters, C. Meetings about meetings: Research at icsi on speech in multiparty conversations. In ICASSP—'03 (Hong Kong, 2003).

Muslea, I., Minton, S., and Knoblock, C. Active + semi-supervised learning = robust multi-view learning. In Proceedings of the 19th International Conference on Machine Learning (ICML 2002), pp. 435-442.

Natalie, R., Ronnie, T., and Chen, F. Examining the redundancy of multimodal input. In OZCHI 2006 (Sydney, Australia, 2006).

Neti, C., Potamianos, G., Luettin, J., Matthews, I., Glotin, H., and Vergyri, D. Large-vocabulary audio-visual speech recognition: A summary of the johns hopkins summer 2000 workshop. In Proc. IEEE Workshop on Multimedia Signal Processing (Cannes, 2001).

Ng, K. Towards robust methods for spoken document retrieval. In ICSLP '98 (Sydney, Australia, 1998).

Ng, K., and Zue, V. Subword-based approaches for spoken document retrieval. Speech Communication 32,3 (2000), 157-186.

Nicolescu, M., and Mataric, M. J. Natural methods for robot task learning: Instructive demonstration, generalization and practice. In Second International Joint Conference on Autonomous Agents and Multi-Agent Systems (Melbourne, Australia, 2003).

Nuance. Dragon audiomining: http://www.nuance.com/audiomining/sdk/.

Oviatt, S. Integration and synchronization of input modes during multimodal human computer interaction. In Proceedings of CHI (1997), pp. 415-422.

Oviatt, S., and Cohen, P. Multimodal interfaces that process what comes naturally. Communications of the ACM 43, 3 (2000), 45-53.

Oviatt, S. L. Mutual disambiguation of recognition errors in a multimodal architecture. In Proceedings of the ACM Conference on Human Factors in Computing Systems (1999), A. Press, Ed., pp. 576-583.

Oviatt, S. L., DeAngeli, A., and Kuhn, K. Integration and synchronization of input modes during multimodal human-computer interaction. In Proceedings of Conference on Human Factors in Computing Systems: CHI '97 (New York:, 1997), ACM Press.

Pantic, M., Pentland, A., Nijholt, A., and Huang, T. Human computing and machine understanding of human behavior: A survey. In Eighth International Conference on Multimodal Interfaces (ICMI '06) (Banff, Alberta, Canada, 2006), pp. 239-248.
Park, A., and Glass, J. R. Towards unsupervised pattern discovery in speech. In Proc. ASRU (San Juan, Puerto Rico, 2005), pp. 53-58.
Porzel, R., and Strube, M. Towards context-adaptive natural language processing systems. In Computational Linguistics for the New Millenium: Divergence or Synergy, M. Klenner and H. Visser, Eds. Lang, Frankfurt am Main, 2002.
Ravishankar, M. Efficient algorithms for speech recognition. Ph.D Thesis Tech Report. CMU-CS-96-143, Carnegie Mellon University, May 1996.
Rosenfeld, R. Optimizing lexical and n-gram coverage via judicious use of linguistic data. In Eurospeech '95 (1995), pp. 1763-1766.
Roy, D. Learning visually grounded words and syntax for a scene description task. Computer Speech and Language 16 (2002), 353-385.
Roy, D. Grounded spoken language acquisition: Experiments in word learning. IEEE Transactions on Multimedia. 5,2 (2003), 197-209.
Roy, D., and Mukherjee, N. Towards situated speech understanding: Visual context priming of language models. Computer Speech and Language 19, 2 (2005), 227-248.
Roy, D., and Pentland, A. Learning words from sights and sounds: A computational model. Cognitive Science 26, 1 (2002), 113-146.
Salton, G., and Buckley, C. Term-weighting approaches in automatic text retrieval. Information Processing and Management 24, 5 (1988), 513-523.
Saraclar, M., and Sproat, R. Lattice-based search for spoken utterance retrieval. In HLT/NAACL (Boston, 2004), pp. 129-136.
Schimke, S., Vogel, T., Vielhauer, C., and Dittmann, J. Integration and fusion aspects of speech and handwriting media. In in Proceedings of the Ninth International Speech and Computer Conference (SPECOM'2004) (2004), pp. 42-46.
Seekafile. http://www.seekafile.org/.
Seide, F., Yu, P., Ma, C., and Chang, E. Vocabulary-independent search in spontaneous speech. In ICASSP (Montreal, Canada, 2004).
Sethy, A., Narayanan, S., and Parthasarthy, S. A syllable based approach for improved recognition of spoken names. In Proceedings of the ISCA Pronunciation Modeling Workshop (Estes Park, CO., 2002).
Szoke, I., Schwarz, P., Matejka, P., Burget, L., Karafiat, M., Fapso, M., and Cernocky, J. Comparison of keyword spotting approaches for informal continuous speech. In Interspeech'2005—Eurospeech (Lisbon, 2005), pp. 633-636.
Tenenbaum, J. B., and Xu, F. Word learning as bayesian inference. In Proceedings of the 22nd Annual Conference of the Cognitive Science Society (2000).
WaveSurfer. http://www.speech.kth.se/wavesurfer/.
Woodward, A. L., Sommerville, J. A., and Guajardo, J. J. How infants make sense of intentional action. In Intentions and Intentionality, B. F. Malle, L. J. Moses, and D. A. Baldwin, Eds. MIT Press, Cambridge, MA, 2001, pp. 149-170.
Bahrick, L., Lickliter, R., and Flom, R. Intersensory redundancy guides infants selective attention, perceptual and cognitive development. Current Directions in Psychological Science 13 (2004), 99-102.
Baldwin, D., and Baird, J. A. Discerning intentions in dynamic human action. TRENDS in Cognitive Science 5, 4 (2001), 171-178.
Baldwin, D. A., Markman, E. M., Bill, B., Desjardins, R. N., Irwin, J. M., and Tidball, G. Infants reliance on a social criterion for establishing word object relations. Child development 67 (1996), 3125-3153.
Bazzi, I. Modelling Out-of-Vocabulary Words for Robust Speech Recognition. Doctor of philosophy, Massachusetts Institute of Technology, 2002.
Bazzi, I., and Glass, J. R. Modeling out-of-vocabulary words for robust speech recognition. In Proceedings of the 6th International Conference on Spoken Language Processing (Beijing, China, 2000).
Black, A., Taylor, P., and Caley, R. The festival speech synthesis system: System documentation. Tech. rep., Human Communication Research Centre, 1998.
Bluethmann, W., Ambrose, R. O., Diftler, M., Askew, S., Huber, E., Goza, M., Rehnmark, F., Lovchik, C., and Magruder, D Robonaut: A robot designed to work with humans in space. Autonomous Robots 14, 2-3 (2003), 179-197.
Brachman, R., and Lemnios, Z. Darpa's new cognitive systems vision. Research News 14, 5 (2002), 1-8.
Brennan, S. Lexical entrainment in spontaneous dialogue. In in Proceedings of the International Symposium on Spoken Dialogue (Philadelphia, USA, 1996), pp. 41-44.
Cardillo, P. S., Clements, M., and Miller, M. S. Phonetic searching vs. lyscr: How to find what you really want in audio archives. International Journal of Speech Technology 5 (2002), 9-22.
Chai, J. Y., Prasov, Z., Blaim, J., and Jin, R. Linguistic theories in efficient multimodal reference resolution: An empirical investigation. In International Conference on Intelligent User Interfaces (San Diego, CA, 2005), ACM Press, pp. 43-50.
Chronis, G., and Skubic, M. Sketched-based navigation for mobile robots. In Proceedings of the 2003 IEEE International Conference on Fuzzy Systems (FUZZIEEE 2003) (St. Louis, MO, 2003).
Chung, G., Seneff, S., and Wang, C. Automatic acquistion of names using speak and spell mode in spoken dialogue systems. In Proceedings of HLT-NAACL 2003 (Edmonton, Canada, 2003), pp. 197-200.
Cohen, P., McGee, D., Oviatt, S., Wu, L., Clow, J., King, R., Julier, S., and Rosenblum, L. Multimodal interaction for 2d and 3d environments. IEEE Computer Graphics and Applications 19, 4 (1999), 10-13.
Cohen, P. R., Cheyer, A. J., Wang, M., and Baeg, S. C. An open agent architecture. In AAAI Spring Symposium (1994), pp. 1-8.
Zhou, M.D., et al., "A graph-matching approach to dynamic media allocation in intelligent multimedia interface," in International Conference on Intelligent User Interfaces, San Diego, CA 2005. ACM Press, pp. 114-121.
Hosom, J.-P. Automatic Time Alignment of Phonemes Using Acoustic-Phonetic Information. Ph.d., Oregon Graduate Institute, 2000.
Hsieh, Y.-c., Huang, Y.-t., Wang, C.-c., and Lee, L.-s. Improved spoken document retrieval with dynamic key term lexicon and probabilistic latent semantic analysis (plsa). In ICASSP (2006).
Huang, X., Oviatt, S., and Lunsford, R. Combining user modeling and machine learning to predict users multimodal integration patterns. In 3rd Joint Workshop on Multimodal Interaction and Related Machine Learning Algorithms (Bethseda, MD, 2006).
Itoh, Y. A matching algorithm between arbitrary sections of two speech data sets for speech retrieval. In ICASSP '01 (Salt Lake City, Utah, 2001).
Itoh, Y. Shift continuous dp: A fast matching algorithm between arbitrary parts of two time-sequence data sets. Systems and Computers in Japan 36, 10 (2005), pp. 43-53.
Itoh, Y., Tanaka, K., and Lee, S.-W. An algorithm for similar utterance section extraction for managing spoken documents. Multimedia Systems 10, 5 (2005), 432-443.
Kaiser, E., Olwal, A., McGee, D., Benko, H., Corradini, A., Li, X., Cohen, P., and Feiner, S. Mutual disambiguation of 3d multimodal interaction in augmented and virtual reality. In International Conference on Mutimodal Interfaces (ICMI '03) (2003), pp. 12-19.
Kaiser, E. C., and Cohen, P. R. Implementation testing of a hybrid symbolic/statistical multimodal architecture. In Proceedings of the International Conference on Spoken Language Processing (ICSLP 2002) (Denver, 2002), pp. 173-176.
Kipper, K., Dang, H. T., and Palmer, M. Class-based construction of a verb lexicon. In AAAI—2000 Seventeenth National Conference on Artificial Intelligence (Austin, Texas, 2000).
Lopresti, D., and Wilfong, G. Cross-domain approximate string matching. In Proceedings of Sixth International Symposium on String Processing and Information Retrieval (1999), pp. 120-127.
Lopresti, D., and Wilfong, G. Cross-domain searching using handwritten queries. In Proceedings of Seventh International Workshop on Frontiers in Handwriting Recognition (Amsterdam, 2000).
MacEachren, A. M., Cai, G., McNeese, M., Sharma, R., and Fuhrmann, S. Geocollaborative crisis management: designing technologies to meet real-world needs. In Proceedings of the 2006 national conference on Digital government research (San Diego, California, 2006), pp. 71-72.

Miller, D., Schwartz, R., and Weischedel, R. Named entity extraction from broadcast news. In DARPA Broadcast News Workshop (1999).

Moreno, R., and Mayer, R. E. Verbal redundancy in multimedia learning: When reading helps listening. Journal of Educational Psychology 94, 1 (2002), 156-163.

Ng, C., and Zobel, J. Speech retrieval using phonemes with error correction. In Proceedings of the 21st annual international ACM SIGIR conference on Research and development in information retrieval (Melbourne, Australia, 1998), pp. 365-366.

Ohtsuki, K., Hiroshima, N., Oku, M., and Imamura, A. Unsupervised vocabulary expansion for automatic transcription of broadcast news. In IEEE International Conference on Acoustics, Speech, and Signal Processing, 2005. Proceedings (ICASSP '05).

Oviatt, S. Multimodal interfaces for dynamic interactive maps. In in Proceedings of Conference on Human Factors in Computing Systems (1996), CHI '96:, New York, ACM Press, pp. 95-102.

Oviatt, S. Ten myths of multimodal interaction. Communications of the ACM 42, 11 (1999), 74-81.

Oviatt, S., Coulston, R., Tomko, S., Xiao, B., Lunsford, R., Wesson, M., and Carmichael, L. Toward a theory of organized multimodal integration patterns during human-computer interaction. In Proceedings of the 5th IEEE International Conference on Multimodal Interfaces (ICMI'03) (Vancouver, BC, Canada, 2003), pp. 44-47.

Palmer, D., and Ostendorf, M. Improving out-of-vocabulary name resolution. Computer Speech and Language 19, 1 (2005), 107-128.

Pan, S., Shen, S., Zhou, M. X., and Houck, K. Two-way adaptation for robust input interpretation for practical multimodal interaction. In Proceedings of ACM Conference on Intelligent User Interfaces (IUI) (2005), pp. 25-32.

Park, A., and Glass, J. R. Unsupervised word acquisition from speech using pattern discovery. In ICASSP '06 (Toulouse, France, 2006).

Pook, P. K., and Ballard, D. H. Deictic tele-assistance. In Proc. IEEE/RSJ/GI Int'l Conf. on Intelligent Robots and Systems (Muenchen, Germany, 1994), pp. 245-252.

Saund, E., and Mahoney, J. Perceptual support of diagram creation and editing. In Diagrams 2004—International Conference on the Theory and Applications of Diagrams (Cambridge, England, 2004).

Schone, P., McNamee, P., Morris, G., Ciany, G., and Lewis, S. Searching conversational telephone speech in any of the world's languages. In International Conference on Intelligence Analysis (Mclean, VA, 2005).

Steil, J. J., Rthling, F., Haschke, R., and Ritter, H. Learning issues in a multi-modal robot-instruction scenario. In Workshop on Programming by Demonstration, Proceedings of IROS (2003).

Voyles, R. M., and Khosla, P. K. Gesture-based programming: A preliminary demonstration. In IEEE International Conference on Robotics and Automation (ICRA) (1999), pp. 708-713.

Wermter, S., Elshaw, M., Weber, C., Panchev, C., and Erwin, H. Towards integrating learning by demonstration and learning by instruction in a multimodal robotics. In IROS—2003 Workshop on Robot Learning by Demonstration (Las Vegas, Nevada, USA., 2003).

Wu, L., Oviatt, S. L., and Cohen, P. R. From members to teams to committee: A robust approach to gestural and multimodal recognition. IEEE Transactions on Neural Networks 13, 4 (Special issue on "Intelligent Multimedia processing") (2002).

Yazgan, A., and Saraclar, M. Hybrid language models for out of vocabulary word detection in large vocabulary conversational speech recognition. In ICASSP '04, vol. 1, pp. 745-748.

Young, S. J., Brown, M. G., Foote, J. T., Jones, G. L. F., and Jones, K. S. Acoustic indexing for multimedia retrieval and browsing. In ICASSP '97.

Yu, C., and Ballard, D. H. A computational model of embodied language learning. Tech. Rep. Technical Report 791, Computer Science Department, University of Rochester, Jan. 2003.

Yu, C., and Ballard, D. H. A multimodal learning interface for grounding spoken language in sensory perceptions. In International Conference on Multimodal Interfaces (ICMI '03) (Vancouver, B.C., Canada, 2003), ACM Press, pp. 164-171.

Yu, C., Ballard, D. H., and Aslin, R. N. The role of embodied intention in early lexical acquisition. In 25th Annual Meeting of Cognitive Science Society (CogSci 2003).

Yu, H., Hripcsak, G., and Friedman, C. Mapping abbreviations to full forms in biomedical articles. Journal of the American Medical Informatics Association 9 (2002), 262-272.

Yu, H., Tomokiyo, T., Wang, Z., and Waibel, A. New developments in automatic meeting transcription. In Proceedings of ICSLP (Beijing, China, 2000).

Yu, P., Chen, K., Lu, L., and Seide, F. Searching the audio notebook: Keyword search in recorded conversation. In HLT/EMNLP (2005).

Yu, P., Chen, K., Ma, C., and Seide, F. Vocabulary-independent indexing of spontaneous speech. IEEE Transactions on Speech and Audio Processing 13, 5 (2005), 635-643.

* cited by examiner

| the | | | test one (hw: testone) | | | | | | | | | taskli(ne) ... | | | | | | | |
|---|---|---|---|---|---|---|---|---|---|---|---|---|---|---|---|---|---|---|---|
| | | | | t | eh | | s | t | | ow | | n | | | | | | | |
| | | | | t | eh | | s | t | | aa | | n | | | ax | | | l | |
| | | | t | k | t | | s | t | | ow | | n | | | | | | | |
| | | | | t | eh | | s | t | | aa | | ng | | | | | | k | |
| | | | | f | eh | | s | t | | ow | | n | | | | | | | |
| dh | eh | ax | dh | t | eh | t | s | t | uw | ao | ah | n | | | k | eh | s | w | ay |
| dh | eh | ax | dh | t | eh | | s | t | w | ao | ah | n | | | k | eh | s | w | ay |
| | eh | | t | | eh | | s | t | w | ao | ax | n | t | hh | | ae | t | w | ay |

FIG.16

| CATEGORY | w | uw | eh | ae |
|---|---|---|---|---|
| SYLLABLE | 0 | 1 | 1 | 1 |
| VOICE | 1 | 1 | 1 | 1 |
| NASAL | 0 | 0 | 0 | 0 |
| RETROFLEX | 0 | 0 | 0 | 0 |
| LATERAL | 0 | 0 | 0 | 0 |
| ASPIRATED | 0 | 0 | 0 | 0 |
| LONG | 0 | 1 | 0.5 | 0 |
| ROUND | 0 | 1 | 0 | 0 |
| PLACE-BILABIAL | 0 | 0 | 0 | 0 |
| PLACE-LAD_LABIODENTAL | 1 | 0 | 0 | 0 |
| PLACE-DENTAL | 0 | 0 | 0 | 0 |
| PLACE-ALVEOLAR | 0 | 0 | 0 | 0 |
| PLACE-RETROFLEX | 0 | 0 | 0 | 0 |
| PLACE-PALATO-ALVEOLAR | 0 | 0 | 0 | 0 |
| PLACE-PALATAL | 0 | 0 | 0 | 0 |
| PLACE-VELAR | 0 | 0 | 0 | 0 |
| PLACE-LAV_LABIO_VELAR | 0 | 0 | 0 | 0 |
| PLACE-GLOTTAL | 0 | 0 | 0 | 0 |
| MANNER-STOP | 0 | 0 | 0 | 0 |
| MANNER-AFFRICATE | 0 | 0 | 0 | 0 |
| MANNER-FRICATIVE | 0 | 0 | 0 | 0 |
| MANNER-APPROXIMANT | 0.6 | 0 | 0 | 0 |
| MANNER-VERY_HIGH_VOWEL (H4) | 0 | 0.4 | 0 | 0 |
| MANNER-HIGH_VOWL (H3) | 0 | 0 | 0 | 0 |
| MANNER-LOW_VOWEL (H2) | 0 | 0 | 0.2 | 0 |
| MANNER-VERY_LOW_VOWEL (H1) | 0 | 0 | 0 | 0.1 |
| HIGH-VERY_HIGH_VOWEL (H4) | 1 | 1 | 0 | 0 |
| HIGH-HIGH_VOWEL (H3) | 0 | 0 | 0 | 0 |
| HIGH-LOW_VOWEL (H2) | 0 | 0 | 0.4 | 0 |
| HIGH-VERY_LOW_VOWEL (H1) | 0 | 0 | 0 | 0.1 |
| BACK-FRONT | 0 | 0 | 1 | 1 |
| BACK-CENTRAL | 0 | 0 | 0 | 0 |
| BACK-BACK | 0.1 | 0.1 | 0 | 0 |

FIG.17

```
* a-9 seed: ================================
0.  a-9   #   f    ow   #   d   r   aw   n   ih   ng
1.  a-1   #   f    ao   r   b   r   aw   n   ih   ng
2.  a-2   #   f    ao   r   d   r   aw   n   ih   ng
3.  a-3   #   jh   ow   #   b   r   aw   n   ih   ng
4.  a-4   #   f    ao   r   b   r   aw   n   ih   ng
5.  a-5   #   jh   ow   #   d   r   aw   n   ih   ng
6.  a-6   #   f    ow   #   b   r   aw   n   ih   ng
7.  a-7   #   f    ao   r   b   r   aw   n   iy   z
8.  a-8   #   jh   ow   #   b   r   aw   n   ih   ng
9.  a-10  hh  #    ow   #   b   r   aw   n   ih   ng

* a-10 seed: ================================
0.  a-10  #   hh   ow   #   b   r   aw   n   ih   ng
1.  a-1   f   #    ao   r   b   r   aw   n   ih   ng
2.  a-2   f   #    ao   r   d   r   aw   n   ih   ng
3.  a-3   jh  #    ow   #   b   r   aw   n   ih   ng
4.  a-4   f   #    ao   r   b   r   aw   n   ih   ng
5.  a-5   jh  #    ow   #   d   r   aw   n   ih   ng
6.  a-6   f   #    ow   #   b   r   aw   n   ih   ng
7.  a-7   f   #    ao   r   b   r   aw   n   iy   z
8.  a-8   jh  #    ow   #   b   r   aw   n   ih   ng
9.  a-9   f   #    ow   #   d   r   aw   n   ih   ng
```

Fig. 19

|        | 0 | 1  | 2  | 3  | 4  | 5  | 6  | 7  | 8  | 9  | 10 | 00.174 (coherence) |
|--------|---|----|----|----|----|----|----|----|----|----|----|---|
| 0 ___  | # | #  | f  | ow | #  | d  | r  | aw | n  | ih | ng |   |
| 1 ___  | # | #  | f  | ao | r  | b  | r  | aw | n  | ih | ng |   |
| 2 ___  | # | #  | f  | ao | r  | d  | r  | aw | n  | ih | ng |   |
| 3 ___  | # | #  | jh | ow | #  | b  | r  | aw | n  | ih | ng |   |
| 4 ___  | # | #  | f  | ao | r  | b  | r  | aw | n  | ih | ng |   |
| 5 ___  | # | #  | jh | ow | #  | d  | r  | aw | n  | ih | ng |   |
| 6 ___  | # | #  | f  | ow | #  | b  | r  | aw | n  | ih | ng |   |
| 7 ___  | # | #  | f  | ao | r  | b  | r  | aw | n  | iy | z  |   |
| 8 ___  | # | #  | jh | ow | #  | b  | r  | aw | n  | ih | ng |   |
| 9 ___  | # | hh | #  | ow | #  | b  | r  | aw | n  | ih | ng |   |
| 10 ssb | # | #  | w  | ae | #  | t  | v  | #  | #  | #  | #  |   |
| 11 ssd | f | #  | w  | ae | t  | p  | s  | #  | #  | #  | #  |   |
| 12 ssa | # | #  | w  | eh | #  | t  | s  | #  | #  | #  | #  |   |
| 13 ssc | # | #  | w  | eh | #  | t  | s  | #  | #  | #  | #  |   |
| sframe | 6 | 9  | 12 | 32 | 36 | 39 | 44 | 45 | 45 | 45 | 46 |   |

|        | 0 | 1  | 2  | 3  | 4  | 5  | 6  | 7  | 8  | 9  | 10 | 00.154 (coherence) |
|--------|---|----|----|----|----|----|----|----|----|----|----|---|
| 0 ___  | # | #  | hh | ow | #  | b  | r  | aw | n  | ih | ng |   |
| 1 ___  | # | f  | #  | ao | r  | b  | r  | aw | n  | ih | ng |   |
| 2 ___  | # | f  | #  | ao | r  | d  | r  | aw | n  | ih | ng |   |
| 3 ___  | # | jh | #  | ow | #  | b  | r  | aw | n  | ih | ng |   |
| 4 ___  | # | f  | #  | ao | r  | b  | r  | aw | n  | ih | ng |   |
| 5 ___  | # | jh | #  | ow | #  | d  | r  | aw | n  | ih | ng |   |
| 6 ___  | # | f  | #  | ow | #  | b  | r  | aw | n  | ih | ng |   |
| 7 ___  | # | f  | #  | ao | r  | b  | r  | aw | n  | iy | z  |   |
| 8 ___  | # | jh | #  | ow | #  | b  | r  | aw | n  | ih | ng |   |
| 9 ___  | # | f  | #  | ow | #  | d  | r  | aw | n  | ih | ng |   |
| 10 ssb | # | w  | #  | ae | t  | v  | #  | #  | #  | #  | #  |   |
| 11 ssd | f | w  | #  | ae | t  | p  | s  | #  | #  | #  | #  |   |
| 12 ssa | # | w  | #  | eh | #  | t  | s  | #  | #  | #  | #  |   |
| 13 ssc | # | w  | #  | eh | #  | t  | s  | #  | #  | #  | #  |   |
| sframe | 6 | 9  | 13 | 32 | 36 | 39 | 44 | 45 | 45 | 45 | 46 |   |

Fig. 20

```
             0    1   2   3   4   5   6   7   8   9  10  11  12  13  14   00.677 (coherence)
             --   --  --  --  --  --  --  --  --  --  --  --  --  --  --  ------
 0  ___      #    f   #   ao  r   b   #   r   aw  n   #   iy  #   z   #
 1  ___      #    f   #   ao  r   b   #   r   aw  n   #   ih  ng  #   #
 2  ___      #    f   #   ao  r   d   #   r   aw  n   #   ih  ng  #   #
 3  ___      #    jh  #   ow  #   b   #   r   aw  n   #   ih  ng  #   #
 4  ___      #    f   #   ao  r   b   #   r   aw  n   #   ih  ng  #   #
 5  ___      #    jh  #   ow  #   d   #   r   aw  n   #   ih  ng  #   #
 6  ___      #    f   #   ow  #   b   #   r   aw  n   #   ih  ng  #   #
 7  ___      #    jh  #   ow  #   b   #   r   aw  n   #   ih  ng  #   #
 8  ___      #    f   #   ow  #   d   #   r   aw  n   #   ih  ng  #   #
 9  ___      hh   #   #   ow  #   b   #   r   aw  n   #   ih  ng  #   #
10  ssb      #    sh  uw  ow  #   p   #   r   aw  m   dh  iy  ng  d   m
11  ssd      #    sh  y   uw  l   b   p   r   aw  m   dh  iy  ng  d   m
12  ssa      #    sh  #   uw  w   b   #   r   aw  n   #   ih  ng  #   #
13  ssc      #    sh  #   uw  w   w   #   er  aw  n   #   iy  ng  #   #
```

Fig. 21

```
Partial Alignment Matrix
 0  ___    #    #    #    r    #    ow
 1  ___    f    ao   #    r    #    #
 2  ___    z    ih   #    r    #    ow
 3  ___    #    ae   #    z    #    #
 4  ___    #    ae   #    d    #    #
 5  ___    #    ih   #    z    #    #
 6  ___    #    #    #    d    #    iy
 7  ___    #    _ey  ey   #    #    #
 8  ___    #    ah   #    #    #    #
 9  ssb    y    iy   iy   d    t    uw
10  ssd    y    #    ey   t    y    uw
11  ssa    n    #    iy   d    t    uw
12  ssc    n    #    iy   d    t    uw Select lines from Partial Alignment Matrix
 4  ___    #    ae   #    d    #    #
 7  ___    #    _ey  ey   #    #    #
12  ssc    n    #    iy   d    t    uw Partial Section from Phone-Distance Table
 | 28 ae          |
 |----------------|
 | 28 ae     0    |
 | 27 eh     2    |
 | 26 ey     3    |
 | 25 ih     3    |
```

Fig. 22

|   | 13 | 14 | 15 | 16 | 17 | 18 | 19 | 20 | 21 | 22 | 23 | 24 | 25 | 26 | 27 | 28 | 29 | 30 | 31 | 32 | 33 | 00.616 |
|---|----|----|----|----|----|----|----|----|----|----|----|----|----|----|----|----|----|----|----|----|----|--------|
| 0 ssd | # | ao | ay | n | f | r | d | jh | y | uw | l | p | r | # | aw | # | m | # | ih | ng | d | |
| 1 ssa | l | oy | ih | n | f | er | d | jh | # | uw | l | b | r | _aw | aw | # | n | # | ih | ng | # | |
| 2 ssb | # | oy | # | n | f | er | d | jh | y | uw | l | p | r | ae | ah | # | n | # | ih | ng | # | |
| 3 ssc | l | oy | # | n | f | er | d | jh | # | uw | l | b | r | # | aw | # | n | # | ih | ng | # | |
| 4 ___ | # | # | # | # | # | # | # | jh | # | ow | # | b | r | # | ah | # | n | # | ih | ng | # | |
| 5 ___ | # | # | # | # | # | # | # | jh | # | ow | # | b | r | # | aw | t | # | # | ih | ng | # | |
| 6 ___ | # | # | # | # | # | # | # | jh | # | ow | # | k | r | # | ah | # | n | # | ih | ng | # | |
| 7 ___ | # | # | # | # | # | # | # | jh | # | ow | # | k | r | # | aw | t | # | # | ih | ng | # | |
| 8 ___ | # | # | # | # | # | # | # | jh | # | ow | # | b | r | # | aw | # | n | r | ih | ng | # | |

Fig. 23

```
Phone ensemble phones (horizontal axis):
hh uh v d ah m d ch y uw hh iy uh r v b ey n dh ah t b aa ah dh ah r
-- -- - -
Rough association of speech with ensemble phones:
|  buy  |      ... computer ...        |  and/or  |   ... other ...    |

Handwriting LTS phone alignment (vertical axis):

3   2   2   >  |  top edge of aligned recognizer alternates
--  --  --  -  |  ---------------------------------------
    b   >   >  |  b
    ih  >   >  |  ih
b   z   b   >  |  b
ah  iy  ay  >  |  ay
ng  >   >   >  |  ng
k   k   k   >  |. k
ah  ah  ah  >  |  ah
m   m   m   >  |  m
p   p   p   >  |  p
y   y   y   >  |  y
uw  uw  uw  >  |  uw
t   t   t   >  |  t
er  er  er  >  |  er
```

|         |         | (1 hh)      | (2 uh)      | (3 v)       | (4 d)       |     |
|---------|---------|-------------|-------------|-------------|-------------|-----|
|         |         | (_ 000.000) | (I 000.000) | (I 000.000) | (I 000.000) | ... |
| (1      | b)      | (D 000.000) | (D 000.000) | (D 000.000) | (S 023.000) | (S 029.000) ... |
| (2      | ih)     | (D 000.000) | (D 000.000) | (S 011.333) | (D 008.000) | (D 014.000) ... |
| (3      | b)      | (D 000.000) | (D 000.000) | (D 000.000) | (S 033.667) | (S 033.667) ... |
| (4      | ay)     | (D 000.000) | (D 000.000) | (S 008.775) | (D 018.667) | (D 018.667) ... |
| (5      | ng)     | (D 000.000) | (D 000.000) | (D 000.000) | (D 003.667) | (D 003.667) ... |
| (6      | k)      | (D 000.000) | (D 000.000) | (D 000.000) | (S 001.000) | (S 018.667) ... |
| (7      | ah)     | (D 000.000) | (D 000.000) | (S 009.750) | (D 000.000) | (D 003.667) ... |
| (8      | m)      | (D 000.000) | (D 000.000) | (D 000.000) | (D 000.000) | (D 000.000) ... |
| (9      | p)      | (D 000.000) | (D 000.000) | (D 000.000) | (S 013.000) | (S 019.000) ... |
| (10     | y)      | (D 000.000) | (D 000.000) | (D 000.000) | (S 015.000) | (S 022.000) ... |
| (11     | uw)     | (D 000.000) | (D 000.000) | (S 015.550) | (I 000.550) | (D 007.000) ... |
| (12     | t)      | (D 000.000) | (D 000.000) | (D 000.550) | (S 027.950) | (S 024.150) ... |
| (13     | er)     | (D 000.000) | (D 000.000) | (D 000.000) | (D 012.950) | (S 016.150) ... |

```
            19  20  21  22  23 |  24  25  26  27  28 |  29  30
            --- --- --- --- ---|--- --- --- --- --- |--- ---
 0 ssb       r  uh   r   f   # |   r  ih   #   #  hh |  er   w
 1 ssa       r  uh   r   f  er |   r  ih   1  jh   # |  er   w
 2 ssc       r  uh   r   f  er |   r  ih   1  jh   # |  er   w
 3 ssd       y   #  er   f   # |   r  ih   #   v  uh |   r   w
 4 ___       #   #   #   #  er |   #  ay   #   v   # |   #   #
 5 ___       r  ah   #   #   m |   #   #   #   #   # |   #   #
 6 ___       #   #   #   #   # |  er  ih   #   v  ah |   #   #
 7 ___       #   #   #   #   # |  er  ay   #   v   # |   #   #
 8 ___       #  aa   #   #   # |   r  uw   #   d  ah |   #   #
 9 ___       #   #   #   #   # |  er  ay   #   v   # |   #   #
10 ___       #   #   #   #   # |  er  ay   #   v   # |   #   z
11 ___       #   #   #   #   # |  er  ih   #   v  ah |   #   #
12 ___       #   #   #   #   # |  er  ay   #   v   # |  er   #
13 ___       #   #   #   #   # |  er  uw   #   b  ah |   #   #

.. (pruned).. |   | .... "arrive" .... |
```

Fig. 27

```
      pos   0   1   2   3   4   5   6   7   8   9  10  11  12  13  14
            --- --- --- --- --- --- --- --- --- --- --- --- --- --- ---
 7 ___       #  jh   #  ow   #   b   #   r  aw   n   #  ih   #   #  ng
 8 ___       #   f   #  ow   #   d   #   r  aw   n   #  ih   #   #  ng
 9 ___      hh   #   #  ow   #   b   #   r  aw   n   #  ih   #   #  ng
10 ssb       #  sh  uw  ow   #   p   #   r  aw   m  dh  iy  ng   d   m
11 ssd       #  sh   y  uw   l   b   p   r  aw   m  dh  iy  ng   d   m
12 ssa       #  sh   #  uw   w   b   #   r  aw   n   #  ih  ng   #   #
13 ssc       #  sh   #  uw   w   w   #  er  aw   n   #  iy  ng   #   #
```

Fig. 28

```
10 ssb  ___  10  20  32  ___  41  ___  49  62  73  80  83  88  96 105
11 ssd  ___   7  18  23   35  42   46  49  60  73  80  83  88  95 104
12 ssa  ___  10  ___ 10  10  43  ___  43  43  75  ___  75  75  ___ ___
13 ssc  ___  10  ___ 10  10  49  ___  49  63  63  ___  82  82  ___ ___ sframe       0   8  19  27  35  41   46  49  61  73  80  83  88  95 104
```

Fig. 29

```
        0   1   2   3   4   5   6   7   8   9  10  11  12  13  14   00.446
       --- --- --- --- --- --- --- --- --- --- --- --- --- --- ---   ------
 0 ___  #   f   #   ow  #   d   #   r   aw  n   #   ih  ng  #   #
 1 ___  #   f   #   ao  r   b   #   r   aw  n   #   ih  ng  #   #
 2 ___  #   f   #   ao  r   d   #   r   aw  n   #   ih  ng  #   #
 3 ___  #   jh  #   ow  #   b   #   r   aw  n   #   ih  ng  #   #
 4 ___  #   f   #   ao  r   b   #   r   aw  n   #   ih  ng  #   #
 5 ___  #   jh  #   ow  #   d   #   r   aw  n   #   ih  ng  #   #
 6 ___  #   f   #   ow  #   b   #   r   aw  n   #   ih  ng  #   #
 7 ___  #   f   #   ao  r   b   #   r   aw  n   #   iy  z   #   #
 8 ___  #   jh  #   ow  #   b   #   r   aw  n   #   ih  ng  #   #
 9 ___  hh  #   #   ow  #   b   #   r   aw  n   #   ih  ng  #   #
10 ssb  #   sh  uw  ow  #   p   #   r   aw  m   dh  iy  ng  d   m
11 ssd  #   sh  y   uw  l   b   p   r   aw  m   dh  iy  ng  d   m
12 ssa  #   sh  #   uw  w   b   #   r   aw  n   #   ih  ng  #   #
13 ssc  #   sh  #   uw  w   w   #   er  aw  n   #   iy  ng  #   #
sframe  0   8   19  27  35  41  46  49  61  73  80  83  88  95  104
```

Fig. 30

```
 0.   1  91  2           JOE BROWN       || jh ow + b r aw n
 1.   1  91  3           JOE BROWN MEAN  || jh ow + b r aw n + m iy n
 2.   1  91  3           JOE BROWN RING  || jh ow + b r aw n + r ih ng
 3.   1  91  2           SHOW BROWN      || sh ow + b r aw n
 4.   1  91  3           JOE BROWN MEANS || jh ow + b r aw n + m iy n z
 5.   1  91  3           JOE BROWN DING  || jh ow + b r aw n + d ih ng
 6.   1  91  3           JOE BROWN E.    || jh ow + b r aw n + iy
...
81.   1  91  3           JOE BRAND TEA   || jh ow + b r ae n d + t iy
82.   1  91  3           SHOW BRAND A.   || sh ow + b r ae n d + ey
83.   1  91  3           SHOW BRAND AIM  || sh ow + b r ae n d + ey m
84.   1  91  3           SHOW BRAND T.   || sh ow + b r ae n d + t iy
85.   1  91  3           SHOW BRAND TEA  || sh ow + b r ae n d + t iy
```

Fig. 31

| ID | sf | ef | CombProb | Cohere | LAlign | PAlign | MatchLS | Handwriting | \|\| | Lattice |
|----|----|----|----------|--------|--------|--------|---------|-------------|------|---------|
| 0 | 1 | 91 | 0.770 | 0.790 | 0.727 | 0.755 | 0.944 | JoeBrowning | \|\| | JOE_BROWN_RING |
| 1 | 1 | 91 | 0.762 | 0.789 | 0.727 | 0.748 | 0.944 | JoeBrowning | \|\| | JOE_BROWN_DING |
| 2 | 1 | 91 | 0.738 | 0.791 | 0.636 | 0.758 | 0.885 | JoeBrowning | \|\| | JOE_BROWN_THING |
| 3 | 1 | 91 | 0.724 | 0.727 | 0.636 | 0.639 | 0.885 | JoeBrowning | \|\| | JOE_BROWN_RINGS |
| 4 | 1 | 91 | 0.718 | 0.729 | 0.545 | 0.630 | 0.859 | JoeDrowning | \|\| | JOE_BROWN_RING |
| 5 | 1 | 91 | 0.714 | 0.727 | 0.545 | 0.617 | 0.859 | FoeBrowning | \|\| | JOE_BROWN_RING |
| 6 | 1 | 91 | 0.710 | 0.727 | 0.545 | 0.623 | 0.859 | JoeDrowning | \|\| | JOE_BROWN_DING |
| 7 | 1 | 91 | 0.710 | 0.726 | 0.545 | 0.638 | 0.859 | JoeBrowning | \|\| | JOE_BROWN_DINK |
| 8 | 1 | 91 | 0.707 | 0.728 | 0.545 | 0.644 | 0.859 | JoeBrowning | \|\| | JOE_BROWN_LINK |
| 9 | 1 | 91 | 0.706 | 0.725 | 0.545 | 0.610 | 0.859 | FoeBrowning | \|\| | JOE_BROWN_DING |

Fig. 32

$$\left\{ \begin{array}{l} \forall p \in P, p_1 \neq s, p_2 \neq s, \forall j | 0 \leq j \leq c: \\ ct(j, p_1, p_2) = \sum_{i=0}^{r} \sum_{l=j+1}^{c_{ai}} \sum_{k=0}^{r} bg(j, p(i,j), p(k,l)) \end{array} \right\} \quad (1)$$

$$bg(j, p(i,j), p(k,l)) = \begin{cases} 0 & p_1 = p(i,j) \\ 0 & p_2 \neq p(k,l) \\ 1 & else \end{cases} \quad (2)$$

Fig. 35

```
Upper Example:
      score:
      ------------
      0.742, spelling         pronunciation
           ---------------  -------------------------
           'Buy Computer'   'b ay k ah m p y uw t er'
Lower Example:
      score:
      ------------
      0.725, spelling         pronunciation
           ---------------  -------------------------
           'Joe Browning'   'jh ow b r aw n ih ng'
```

Fig. 36

SYSTEMS AND METHODS FOR IMPLICITLY INTERPRETING SEMANTICALLY REDUNDANT COMMUNICATION MODES

PRIORITY CLAIM

This application claims priority to U.S. Provisional Patent Application No. 60/892,500 filed on Mar. 1, 2007, the contents of which are incorporated herein by reference in their entirety.

FIELD OF THE INVENTION

This invention relates generally to systems and methods for receiving, evaluating and comparing multimodal forms of communication activities, and more specifically for receiving, evaluating and comparing speech and handwriting activities to locate temporally redundant terms and determine a best-fit approximation derived therefrom.

BACKGROUND OF THE INVENTION

Person-to-person communication in meetings having routine discussions, brainstorming sessions, or formal presentations are often characterized by redundant or ill-defined verbal and written expressions that may hamper comprehension or reduce the efficiency of the information exchanged by the meeting participants.

During meetings, for example, people present information to each other across multiple modes. Graphically, they may sketch diagrams, like a schedule chart or timeline. Textually, they may handwrite lists of preferred points or concepts, they may label parts of a diagram, or they may type information real time for display on a display screen. While sketching or handwriting they are also likely speaking to each other. Speakers may handwrite on public surfaces (like whiteboards, flipcharts or even table napkins), while listeners jot down personal notes on paper.

People in interaction are always creating new vocabulary. Computational systems with fixed recognition vocabularies cannot recognize such new vocabulary. In order to be better able to understand natural interactions, computational systems need to be able to learn new vocabulary dynamically as they perceive natural communications. For example, the Defense Advanced Research Projects Agency's Cognitive Assistant that Learns and Organizes (CALO) attempts to provide at least some learning capabilities that may eventually support artificially intelligent systems for responding robustly to surprising or unforeseen inputs, just like people do. The CALO project has been attempting to transform computational systems from being simply reactive to being more cognitive.

SUMMARY OF THE INVENTION

At least one embodiment of the present invention relates generally to a system for recognizing instances of redundant communication conveyed between two or more persons where the system at least contemporaneously gathers, evaluates, aligns, refines, and integrates at least certain aspects of the communication to produce best-fit matches of desired terms while dynamically learning these and other terms. By way of example, the system may operate as a background understanding system that does not explicitly ask for user supervision and/or guidance to enroll new terms or vocabulary.

In one aspect of the present invention, a system for recognizing and evaluating possible relationships between terms expressed during cross-communication activities includes a memory; a processor in signal communication with the memory; a speech recognition system having a speech collection device arranged to receive a speech portion and then transcribe the speech portion to a first set of sub-word textual sequences related to the speech portion; an ink recognition system having an ink input receiving device configured to receive written input at least contemporaneously while the speech recognition system receives the speech portion, the ink recognition system further configured to identify a second set of sub-word textual sequences related to the written input; and a multimodal fusion engine in signal communication with the processor. The multimodal fusion engine includes an alignment system having a plurality of grammar-based phoneme recognizers configured to identify a number of phonetically close terms corresponding to a modally redundant term defined by a temporal relationship between the speech portion and the written input, the grammar-based phoneme recognizers operable to generate a first-pass alignment matrix in which the first set of sub-word textual sequences related to the speech portion are selectively aligned with the second set sub-word sequences related to the written input; a refinement system in communication with the alignment system for dynamically modeling the first and second sub-word sequences captured in the alignment matrix by identifying a desired path within the alignment matrix and then modifying the desired path based on temporal boundaries associated with the speech portion and the written input; and an integration system in communication with the refinement system to select a desired term that is estimated to be a best-fit to the modally redundant term, the integration system configured to generate a normalized match score based on information received at least from the alignment system and the refinement system.

In another aspect of the invention, a method for recognizing and evaluating possible relationships between terms expressed during multiple communication modes includes at least the steps of (1) detecting at least two modes of communication selected from the group consisting of speech, writing, and physical gestures; (2) receiving at least two of the modes of communication within a memory of a computational processing system; (3) determining a time period between a first communication mode and a second communication mode; (4) aligning a selected feature of the first communication mode with a selected feature of the second communication mode; (5) generating a group of hypothesized redundant terms based on the time period and based on the selected features of the first and second communication modes; (6) reducing a number of the hypothesized redundant terms to populate a matrix of possibly related sub-word units from which a best-fit term is to be selected; and (7) selecting the best-fit term based at least in part on a multimodal redundancy between the first communication mode and the second communication mode.

BRIEF DESCRIPTION OF THE DRAWINGS

Preferred and alternative examples of the present invention are described in detail below with reference to the following drawings:

FIG. 16 is phonetic alignment matrix generated from articulatory-feature distances determined by one or more recognizers of the system of FIG. 5;

FIG. 17 is a table showing comparisons between articulatory features taken from speech and writing input;

FIG. 19 shows two tables having rows of phonemes selectively arranged or seeded;

FIG. 20 shows two tables derived from the table of FIG. 19 and further having a measured coherence value;

FIG. 21 shows a table having rows of phonemes selectively arranged and having a measured coherence value based on a spoken and written example of the phrase "Joe Browning;"

FIG. 22 shows a dipthong expansion table based on a spoken and written example of the phrase "Joe Browning;"

FIG. 23 shows a table showing length mismatched alignment of letter-to-sound phoneme sequences based on a spoken and written example of the phrase "Joe Browning;"

FIG. 24 is a full dynamic programming finished matrix showing an alignment of the written and spoken phrase of "Buy Computer;"

FIG. 25 is a table identifying a global best path for length mismatched alignment of letter-to-sound phoneme sequences based on a spoken and written example of the phrase "Joe Browning;"

FIG. 26 is a table identifying a local best path for length mismatched alignment of letter-to-sound phoneme sequences based on a spoken and written example of the phrase "Joe Browning" and after selective moves made to the table of FIG. 25;

FIG. 27 is a table showing how phonetic outliers are pruned during processing by the system of FIG. 5;

FIG. 28 is a table showing a portion of a phoneme alignment matrix based on a spoken and written example of the phrase "Joe Browning;"

FIG. 29 is a parallel start-frame matrix derived from one or more phoneme recognizers of the system of FIG. 5;

FIG. 30 is an alignment matrix derived from the spoken and written phrase "Joe Browning;"

FIG. 31 is a table of extracted lattice sequences based on temporal boundaries determined from the alignment matrix of FIG. 30;

FIG. 32 is the extracted lattice sequence table of FIG. 31 in a re-ranked order based on a number of scores;

FIG. 35 shows a number of equations usable to develop a positional phoneme-bigram modeling table;

FIG. 36 is a table showing example responses from a multiparser of the system of FIG. 5.

DETAILED DESCRIPTION OF THE PREFERRED EMBODIMENT

Figure 1:
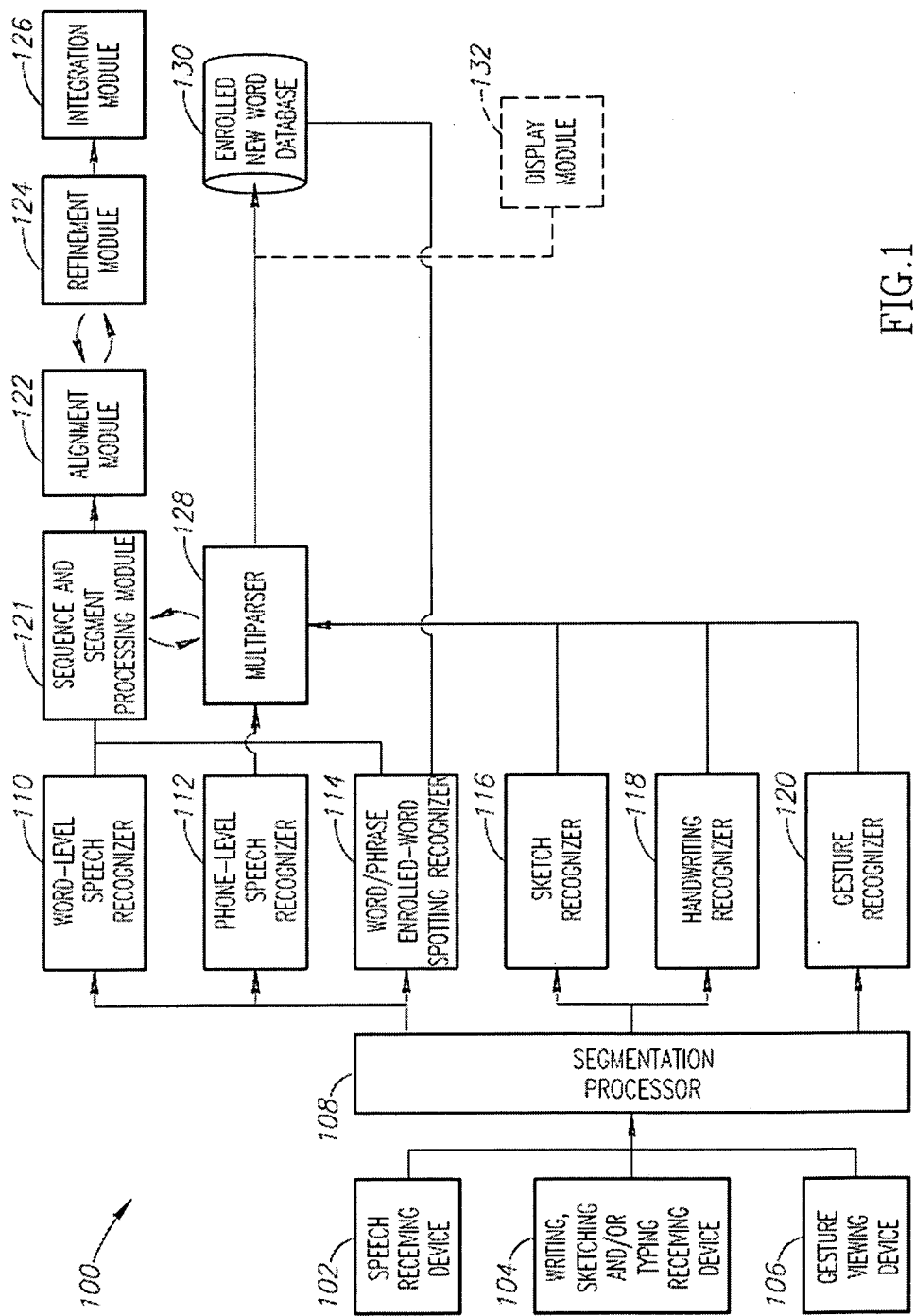
FIG. 1 is a block diagram of a system for recognizing and evaluating possible relationships between terms expressed during cross-communication activities according to an embodiment of the present invention.

In the following description, certain specific details are set forth in order to provide a thorough understanding of various embodiments of the invention. However, one skilled in the art will understand that the invention may be practiced without these details or with various combinations of these details. In other instances, well-known systems and methods associated with, but not necessarily limited to, speech and handwriting recognition systems, voice recordation systems, and audio-to-text transcription systems and methods for operating the same may not be shown or described in detail to avoid unnecessarily obscuring descriptions of the embodiments of the invention.

The following description is generally directed to a system for recognizing instances of redundant communication conveyed between two or more persons where the system at least contemporaneously gathers, evaluates, aligns, refines, and integrates at least certain aspects of the communication to produce best-fit matches of desired terms while dynamically learning these and other terms. The redundant communication is generally understood to be any type of person-to-person communication that may have a temporal relationship. By way of example, one type of redundant communication may include a meeting environment where a presenter speaks a desired term out loud while writing the identical term on a whiteboard. Often, but not always, the desired term is spoken shortly after the desired term was handwritten.

In one embodiment of the present invention, the system described herein operates in the background of such a meeting and unobtrusively operates as an ambient perceptual agent. Various aspects of the system will respectively observe and/or record the speech, handwriting, sketching, gestures, and other forms of human communication that may occur during the meeting. By way of example, the speech may be recorded with microphones and then processed with a speech recognizer. Similarly, the handwriting and/or sketching may be perceived with an ink-sensitive surface and then processed by a sketch or handwriting recognizer. Alternatively or in addition, non-verbal gestures may be recorded and then processed with a video recognizer.

The system may advantageously operate to combine information from complex human-human interactions during meetings, lectures, and other environments. In one aspect, a baseline premise underlying the system recognizes that during meetings or presentations, handwritten terms are typically spoken redundantly. As noted above, the presenter will often speak the desired term shortly after the term has been handwritten. The information gathered from the redundant speech and/or handwriting may be combined and then advantageously aligned, refined, and then integrated to produce a significantly more accurate recognition of a desired term than would be achievable by either speech or handwriting recognition alone. This improved accuracy means that more of the handwritten or spoken words will be recognized correctly.

In addition to accurately discerning desired terms that are handwritten and then spoken redundantly, the system may also recognize and process out-of-vocabulary terms, which are terms that may not be readily recognizable by dictionaries, thesauruses, and other common and/or standard language reference guides. Out-of-vocabulary terms may include, but are not limited to named-entities like proper names, acronyms or slang terms used in a particular industry or field, and other terms that may have a unique meaning or purpose. Unlike conventional speech and handwriting recognizers that simply insert other words in the place of the new unrecognized, out-of-vocabulary term, which in turn may corrupt the recognizer's word sequence modeling and/or cause a cascade of local recognition errors in the vicinity of the insertion, the system described herein leverages the naturally occurring multimodal redundancy (e.g., temporal relationship) between a new out-of-vocabulary term that is handwritten and then spoken, or vice-versa, as a basis for enrolling or adding the new, out-of-vocabulary term to the systems' database of terms.

As used herein, the term "multimodal redundancy" generally means that the same information is presented in more than one mode, for example like a handwritten term that is simultaneously, contemporaneously, or even subsequently spoken such that there is at least some identifiable temporal relationship between the handwritten and spoken terms. Further, the term "multimodal redundancy" may be defined when information provided in one input mode is semantically the same as information in provided in another input mode, as for example, when a presenter handwrites a phrase like, "Propose your solution," while also saying the phrased shortly thereafter. Another example of multimodal redundancy may occur during human-human interactions such as when a person writes a term on a whiteboard or tablet PC surface displayed on a projection screen and then speaks the same term, a substantially similar term, or an abbreviation thereof. Thus, the system may be configured to recognize and evaluate the occurrence and/or significance of multimodal redundant terms and then leverage the various inputs into the system to support dynamic learning of new words and/or abbreviations. In short, multimodal redundancy may occur fairly frequently during certain human-human interactions, and in particular during multiparty interactions, such as in a meeting or presentation environment where a visible, shared space for writing is accompanied by redundant speech from the presenter or one or more of the participants.

Leveraging the multimodal redundancy advantageously provides implicit supervision for enrolling new terms, where an accurate spelling of the new term may be determined from the redundant handwriting and the pronunciation of the new term may be extracted from the redundant speech. Observing and/or recognizing redundancy in multimodal environments may provide for fully bootstrapped learning by the system described herein. Bootstrapped learning generally means learning that does not require external supervision, learning that leverages the system's current capabilities in order to expand and/or refine its future capabilities, and/or learning that allows the system to improve on its own over time and/or usage. One example of bootstrapped learning is the acquisition and usage of verbal and non-verbal forms of communication by human beings.

By way of example, the system may automatically detect occurrences of multimodal redundancy across handwriting and/or speech and then combine the detected information from the redundant modes to dynamically determine the spelling and/or pronunciation of new words or phrases. In one embodiment, the system learns new terms in an early meeting, enrolls those terms into a memory of the system, than uses those enrolled terms to improve recognition of the same or substantially similar terms in a later meeting.

FIG. 1 shows an ambient, perceptual system for receiving, segmenting, recognizing and further processing one or more communication related activities that occur between people across various communication modes like speaking, sketching, handwriting, typing, and/or gesturing according to an embodiment of the present invention. The system 100 includes a speech receiving system 102, a handwriting, sketching, and/or typing receiving system 104, and a gesture recording system 106. For purposes of the detailed description herein, the term "writing system" is used to describe a surface or I/O device for receiving handwritten or typewritten text, sketches, symbols, characters, or any other linguistic representations. The speech receiving system 102 may take the form of one or more microphones positioned to pick up audible sounds. The handwriting, sketching, and/or typing receiving system 104 may take the form of a digital pen in cooperation with digital paper, a stylus and a touch-sensitive display screen, a keyboard in electronic communication with a display screen, or other forms in which handwritten or typed characters and symbols may be input into the system 100 by one or more persons. The gesture recording system 106 may take the form of a video or imaging device, for example a digital video recorder or digital camera using either CMOS or CCD technology.

In addition, the system 100 includes a segmentation system or segmentation processor 108 configured to receive terms and/or phrases of language from the speech receiving system 102, terms and/or phrases of text, symbols, or other characters that have been either type- or hand-written from the handwriting, sketching, and/or typing receiving system 104. Optionally, the segmentation processor 108 may further receive image or video information that may contain a desired video clip or image from an analog or digital video recording device.

Once the desired forms of communication have been processed by the segmentation processor 108, segmented portions of the information from the one or more communication activities, for example, speech, handwriting, sketching, typing, and gesturing, are evaluated by appropriate recognizers. By way of example, a segmented portion of speech is evaluated by a word-level speech recognizer 110, a phoneme-level speech recognizer 112, and word/phrase enrolled-word spotting recognizer 114, which may be integrated together and operable as a single or multiple recognizers. Likewise, a segmented portion of writing may be evaluated by a sketch recognizer 116, a handwriting recognizer 118, or both. Again, these recognizers 116, 118 are shown as separate devices, but may be integrated and operate as a single device. Further, a segmented portion of an image or video clip in which a gesture has been recorded may be evaluated by a gesture recognizer 120.

In addition, the system 100 includes a sequence and segment processing module 121 and a multiparser 128, both of which process the outputs from one or more of the recognizers 110-120. The module 121 and the multiparser 128 are described in greater detail below. The system 100 further includes an alignment module 122, a refinement module 124 and an integration module 126. The alignment, refinement, and integration processes are described in greater detail below. After processing by the integration module 126, the system may enroll new words into an enrolled new word database 130 and optionally transmit the new word to a display module or screen 132.

Figure 2:
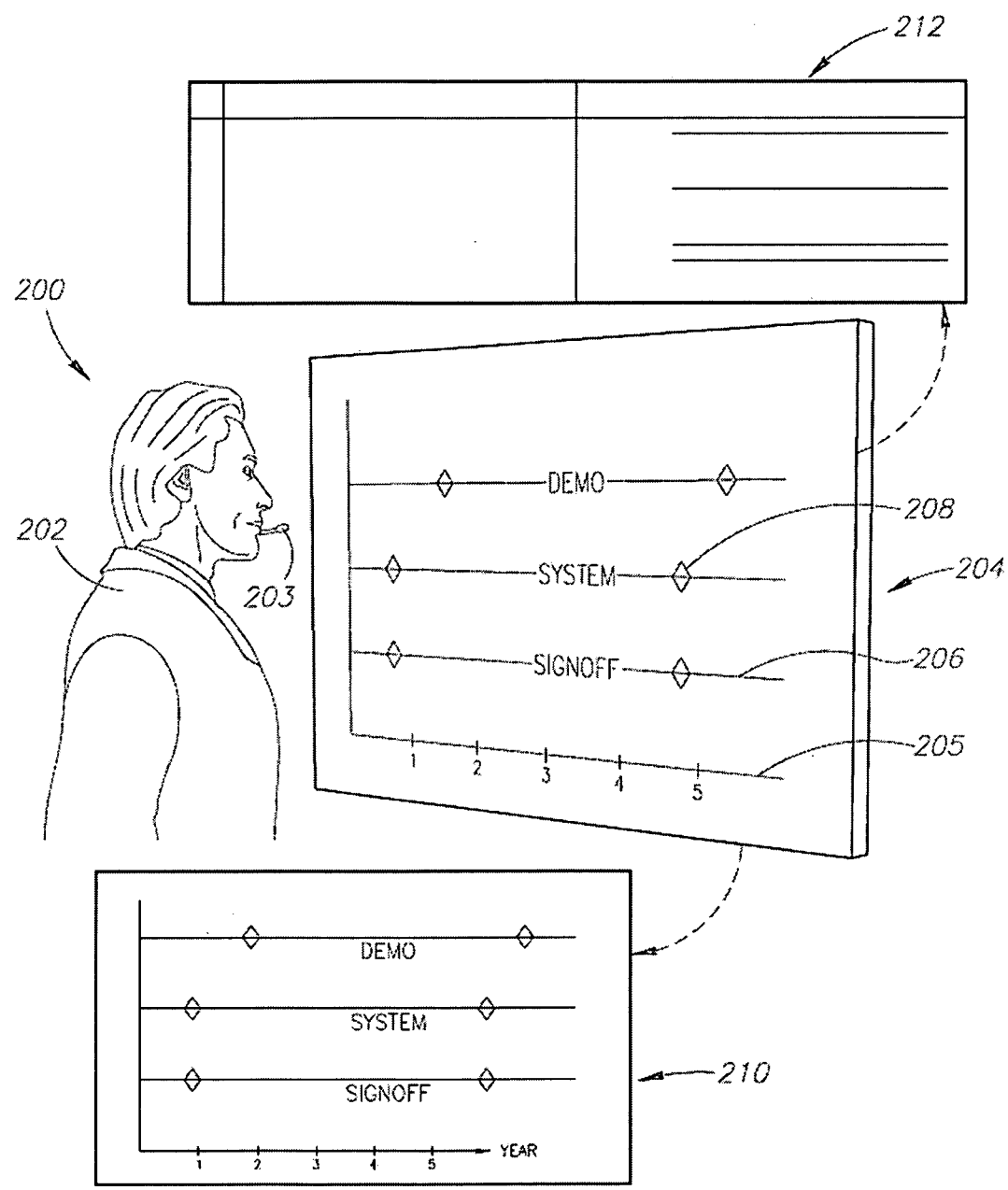
FIG. 2 is a schematic diagram of an ink-sensitive surface receiving user input and providing that input to one or more display devices according to an embodiment of the present invention.

FIG. 2 shows a meeting environment 200 in which a presenter 202 draws a schedule chart 204 with task-lines 206 spanning the duration of a work project with specific goals sketched on each task-line 206 as diamond-shaped milestones 208. During the meeting, the system 100 continually interprets and updates its understanding of one or more communication activities entered into by the presenter 202. By way of example, the presenter's speech may be captured through a speech recording device 203 while the presenter's handwritten characters and symbols may be captured using an ink-sensitive white board 205. The output of the system 100 may be reflected as a labeled schedule chart 210 (shown in the lower left) and/or as an automatically populated Microsoft® Project™ object 212 (shown in the upper right). The information provided in the chart 210 and object 212 includes a number of expanded terms that were dynamically learned by the system 100 as it observed and processed the communication activities of the presenter 202.

Figure 3:
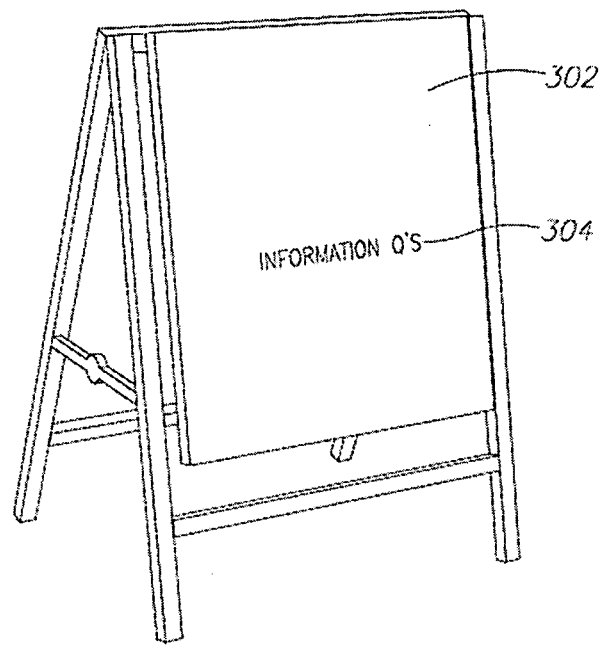
FIG. 3 shows an isometric view of an ink-sensitive surface according to an embodiment of the present invention.

FIG. 3 shows an embodiment of the system 100 in the process of learning new language and/or new language forms that may emerge from complex, collaborative human-human interactions like meetings and/or presentations. Based on the multimodal redundancy premise that presenters often handwrite new terms while saying them, FIG. 3 shows an ink-sensitive flip chart 302 with the phrase 304, Information Q's written thereon while the phrase "[ . . . ] information questions" is temporally spoken by the presenter. The system 100 detects this multimodal redundancy associated with the presenter's communication and associates or grounds the abbreviation Q to its expanded word form Question. Once ground, the presenter may subsequently write the phrase information Q and it will be understood by the system 100 to mean Information Question.

In another, but non-illustrated, example of new terms being dynamically introduced to the system 100, the presenter introduces the abbreviation CAGR while speaking the phrase Category Growth Rate. The five top page hits an internet browser search engine, such as a Google® search engine, on the abbreviation CAGR may result in the expanded meaning of CAGR as Compound Annual Growth Rate. Thus, relying on a static dictionary of common abbreviations may lead to an incorrect interpretation of CAGR=Compound Annual Growth Rate. To find the correct interpretation for CAGR in this dynamic multimodal context, the alignment, refinement, and integration systems 122, 124, and 126 of the system 100 will be needed. The presenter's redundant speech holds the key to the correct interpretation of Category Growth Rate. The same could be true for the abbreviation OS, which through a static dictionary lookup could be associated with any of the terms: Ordnance Survey, Operating System, or Office of the Secretary.

In yet another non-illustrated example, the system 100 may leverage the occurrence of the multimodal redundancy (e.g., handwriting a phrase like Open Source and also speaking it), as a means of enrolling new terms utilizing the alignment, refinement, and integration systems 122, 124, and 126 of the system 100, which will each be described in greater detail below. Continuing with the example, subsequent speaking of Open Source while handwriting its first-letter abbreviation will then be automatically recognized and/or grounded by the system 100 such that for acronyms like OSI (Open Source Initiative) and OSDL (Open Source Development Labs) the initial letters OS are associated or grounded with respect to the phrase, Open Source.

Figure 4:
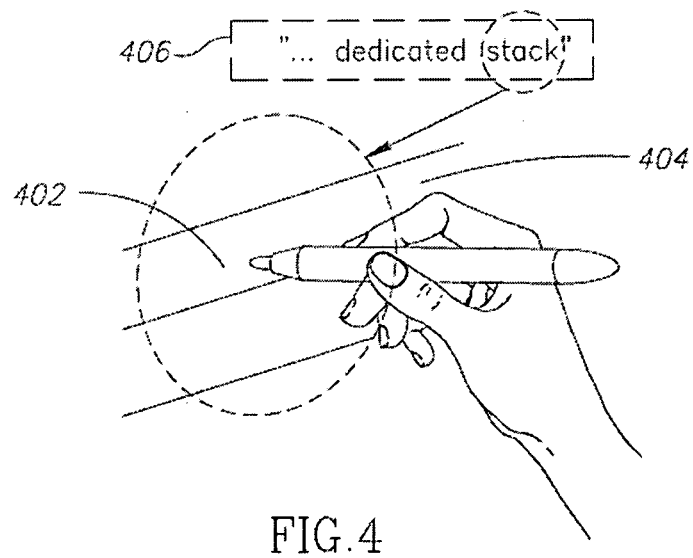
FIG. 4 is a perspective view of an interactive, ink-sensitive surface according to another embodiment of the present invention.

FIG. 4 shows an example of the system 100 used to ground a symbol 402 drawn or sketched on an ink-sensitive surface 404. Symbols and symbol hierarchies are generally grounded on perceptual, observable, and even transient features in the physical world. In the illustrated example, the presenter speaks the phrase 406, "dedicated stack," while redundantly sketching a graphical or iconic stack symbol 402. Later, after sketching several more similar stack symbols 402 on other portions of the surface 404, the presenter may make reference to one or more of them with a deictic point gesture, and as described in more detail below, the system 100 may redundantly associate the gesture with the stack symbol 402.

Redundant speech and/or a physical gesture may be interpreted by the system 100 to support dynamic enrollment of new terms. For example, a user makes a gesture with their hand to flip it from palm down to palm up while saying, "Flip that chair." In this example, the system 100 may leveraging the multimodal redundancy between the gesture and the spoken phrase to associate or ground the phrase "Flip that chair" with that particular gesture. This sort of grounding through the recognition of one or more physical gestures temporally related to a spoken phrase may also apply to other gestures, such as, but not limited to, head/body posture, facial expressions, indications of assent/dissent, indications of attention/inattention, and many other types of human gestures.

All of these contexts of multimodal redundancy lend themselves to the task of learning new vocabulary—either spoken, sketched, handwritten or gestural vocabulary. Collectively, the ability of the system 100 to computationally facilitate the aforementioned association or grounding examples may be referred to as Multimodal Out-Of-Vocabulary Recognition (MOOVR). MOOVR techniques support bootstrapped learning, because multimodal redundancy serves as the basis for perceptual grounding, which in turn supports the transfer of semantics grounded in one mode to new, alternative symbols in another mode. The system 100 accomplishes this by learning new words, enrolling their spelling and/or pronunciation, and/or then using the subsequent recognition of an enrolled word to transfer its meaning to a corresponding, but previously unknown abbreviation or acronym, for example.

As will be described in greater detail below, the system 100 may recognize shared indexical features of a portion of a phrase or term, such as, but not limited to the common pronunciation references and/or certain relationships that may be deduced from known spelling variations, which may include abbreviations and acronyms (e.g., the same word will have a first-letter abbreviation, a morphological prefix abbreviation, a first syllable abbreviation, etc.). Further, the system 100 may utilize portions of speech and handwriting to allow for meaningful phrases to be built up from combinations of lower level symbols. In building up such combinations not all lower level symbols need occur in the same communication mode. It is possible, by leveraging multimodal redundancy, to transfer meaning from known symbols in one communication mode to unknown symbols in another communication mode, for example as described above where the OS prefix of the unknown handwritten symbols, OSI and/or OSDL, were assigned the meaning of a known spoken phrase, Open Source. This is a type of association or grounding may be referred to as multimodal semantic grounding.

During presentations or meetings, when proper names or abbreviations are handwritten on a whiteboard or other public writing surface they are typically also spoken redundantly. As a practical matter, it is not possible to expand vocabulary databases enough to cover all such out-of-vocabulary (OOV) terms. Therefore, the system 100 utilizes several multimodal recognizers that leverage the occurrence of a modal communication redundancy, which may occur across handwritten, typed, spoken, or gestured communication, to discern the spelling, pronunciation and/or contextual semantics of OOV terms within a desired time and also to find a best fit between a first term expressed during a first mode of communication with a second term expressed during a second mode of communication (e.g., a best fit between the spoken phrase Compound Annual Growth Rate and its written abbreviation of CAGR or a best fit between a hand flip gesture and a modally redundant written term of "flip that chair").

In one embodiment, the system 100 may be used to support a remote meeting collaboration by distributing to a remote user a semantically enhanced representation in the form of a focus bubble and/or a hover label that explains, defines or clarifies an abbreviation of a spoken term or phrase. In addition, the system 100 may operate to generate an association or grounding of a base term, for example a person's proper name, with a subsequently communicated subjective, objective, and/or possessive pronoun. For example, the system 100 may operate to help a remote participant understand that the spoken phrase " . . . there is a problem with his office space" refers to the office-space-availability for an employee named for Joe Browning.

Figure 5:
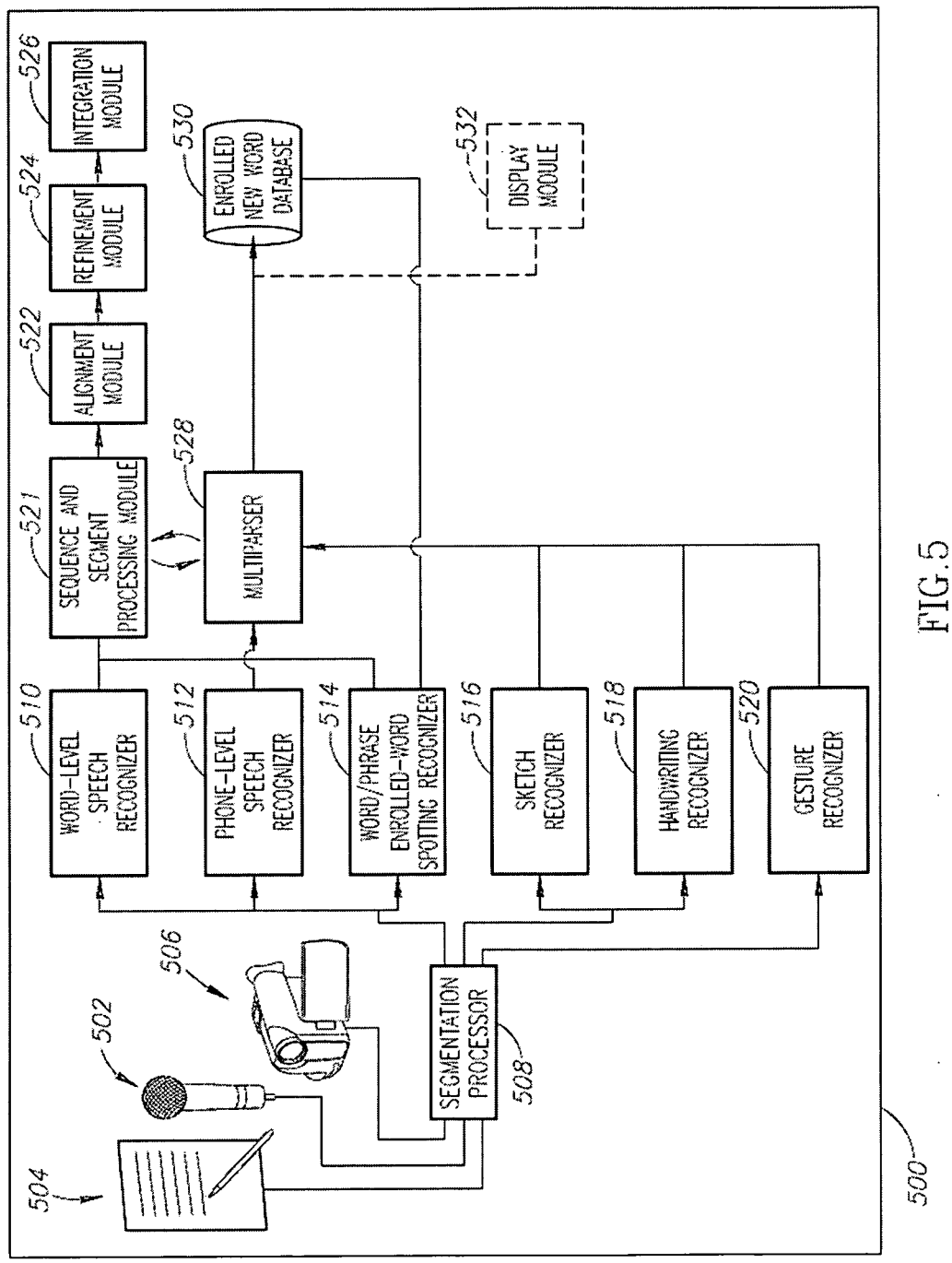
FIG. 5 is a block diagram of a system for recognizing and evaluating possible relationships between terms expressed during cross-communication activities according to another embodiment of the present invention.

FIG. 5 shows a system 500 employs a suite of capture or receiving devices, recognizers and modules that operate to receive, process, recognize, align, refine, and then integrate one or more terms or symbols expressed during human-to-human communication activities. In the illustrated embodiment, the system 500 includes a speech receiving and/or recordation device 502, such as a microphoneme, an interactive, ink-sensitive surface 504, such as a whiteboard or a piece of digital paper, for receiving handwritten or sketched markings, and a gesture viewing and/or recording device 506, such as a digital imaging camera or video camera arranged to capture gesturing events. Preferably, the system 500 operates unobtrusively to receive, collect, recognize, align, refine, and then integrate one or more multimodally redundant forms of communication. The various aspects and features of the system 500 are described in detail below.

By way of example, the gesture viewing device 506 may recognize a deictic pointing events during a meeting and then leverage its understanding of the meeting's content to distribute a semantically enhanced representation of that pointing event.

One objective of the system 500 is to acquire new vocabulary dynamically in context. In one embodiment, the system 500 identifies the relevant features based on a multimodal redundancy associated with a number of cues coming into the system. Multimodal redundancy is the situational identifier that focuses attention on the preferred features to be learned: the redundantly presented spoken word and/or its hand- or type-written spelling.

Figure 6:
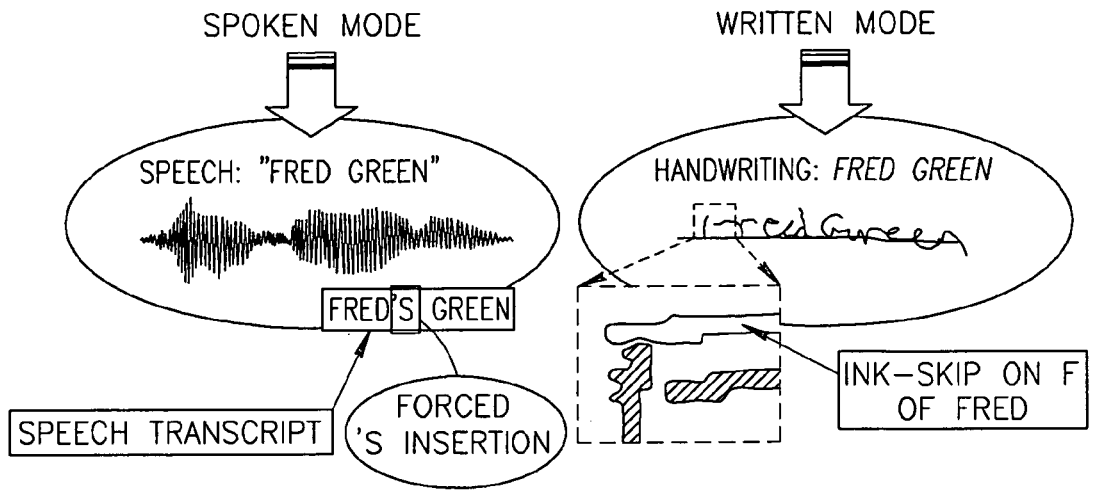
FIG. 6 shows speech input and writing input received by the system of FIG. 5 and having a temporal relationship.

FIG. 6 shows a diagram having a speech communication mode and a written communication mode received by the system 500. In the illustrated embodiment, a facilitator drew a chart on an ink-sensitive whiteboard to schedule space and/or equipment for a new hire. The facilitator said "This is our timeline for Fred Green," and also wrote the name on the chart. In this example, the spoken two-word name, Fred Green, would be considered to be an OOV term. Both individual words occurred in the transcribing speech recognizer's vocabulary, but the two-word name, as such, was neither in the vocabulary nor was it part of the training data on which the speech recognizer's language model was built. The system 500 may use a transcribing speech recognizer to distinguish between speech and/or non-speech acoustic input and then produce a transcription of the speech. Because the sequence Fred Green was not explicitly accounted for in the language model of the transcribing speech recognizer, it was forced to choose a sequence that was acoustically very close and/or had some probability assigned to it by the language model. When the transcribing speech recognizer encounters the OOV term, it produces or forces an approximation of the term based on an acoustically similar word or phrase whose sequence has some probability in the language model. In the illustrated example, the result of this forcing was the insertion of a possessive "s" between Fred and/or Green.

Handwriting recognizers also have vocabularies and/or language models. If letters are carefully handwritten then it is possible that OOV terms will be recognized correctly. However, words that are in the handwriting recognizer's vocabulary and/or language model are more easily recognized. FIG. 6 shows, however, that handwriting recognition may be confounded by an error in ink perception. For example, a topmost stroke of the F in Fred was written too lightly on the touch-sensitive whiteboard, which in turn makes it difficult for the handwriting recognizer to interpret the handwriting correctly.

Figure 7:
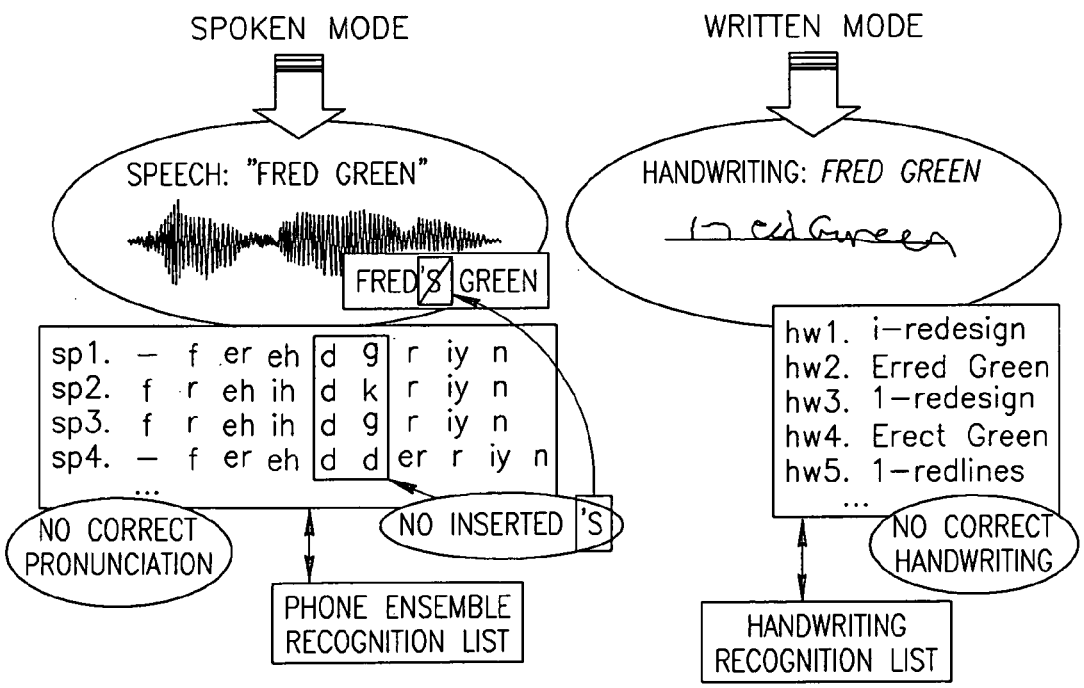
FIG. 7 shows phoneme recognitions taken from the speech input and writing input of FIG. 6.

FIG. 7 shows a list of alternate phoneme-level recognitions of the speech, from an ensemble of four phoneme recognizers. The correct phoneme-level pronunciation is not present on the list; however, phoneme-level recognition does not insert the possessive s between Fred and/or Green that results from the transcribing recognizer's forced insertion. On the left is the list of alternate handwriting recognizer outputs. Due to the ink-skip the correct spelling does not occur.

Another type of speech recognizer that may be used in the system 500 is a phoneme-level recognition. As illustrated in FIG. 7, where below the spoken, Fred Green, is a list of alternate phoneme-level recognitions. The system 500 uses phoneme recognizers to mitigate the effect of forced insertions that are imposed by the transcribing recognizer. None of the phoneme recognizers spuriously inserts the "s" between Fred and/or Green. In this example, phoneme-level recognizers may do a better job at acoustically interpreting the OOV proper name, but the canonically correct pronunciation still is not present in the list.

Figure 8:
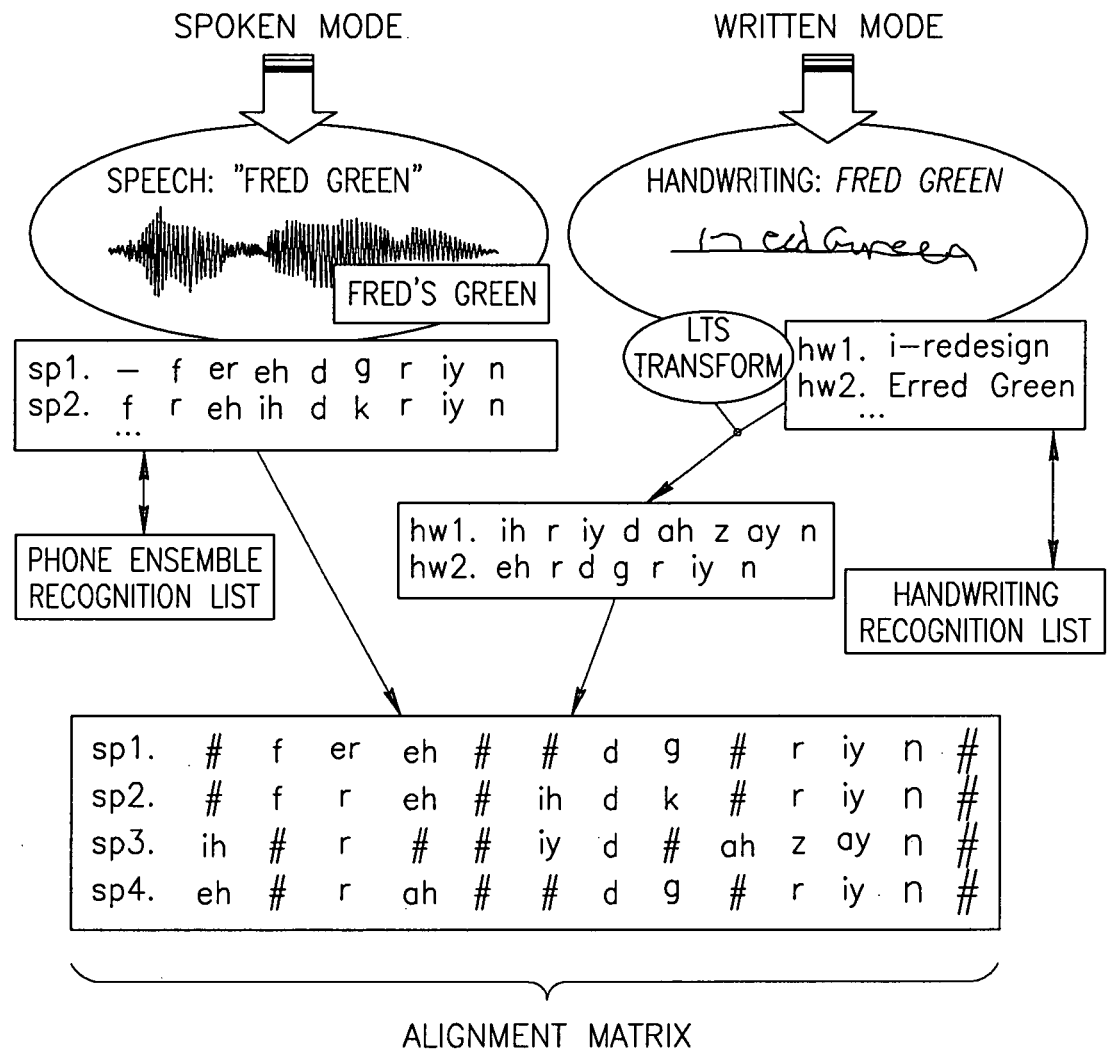
FIG. 8 shows an example of an alignment matrix taken from the phoneme recognitions of FIG. 7.

To detect multimodal redundancy and/or recognize new words, the system 500 aligns the handwritten words to nearby spoken words. Closely matching alignments may then trigger the system to detect instances of multimodal redundancy. To make the handwritten words comparable to the spoken words, the system 500 transforms the handwriting letter-string alternatives into sequences of phonemes. This process is called Letter-To-Sound (letter-to-sound) transformation. In one embodiment, the system 500 accomplishes the letter-to-sound transformation by using a letter-to-sound transformation module. The resulting phonemes are then aligned against the speech phonemes as shown in the Alignment Matrix at the bottom of FIG. 8.

After speech and/or handwriting streams have been individually recognized, they need to be aligned to check for redundancy. First the handwriting is put through a Letter-To-Sound transform (letter-to-sound), which is a transformation of sequences of letters into sequences of phonemes. Then the phoneme sequences will be aligned with letter-to-sound phoneme sequences.

Figure 9:
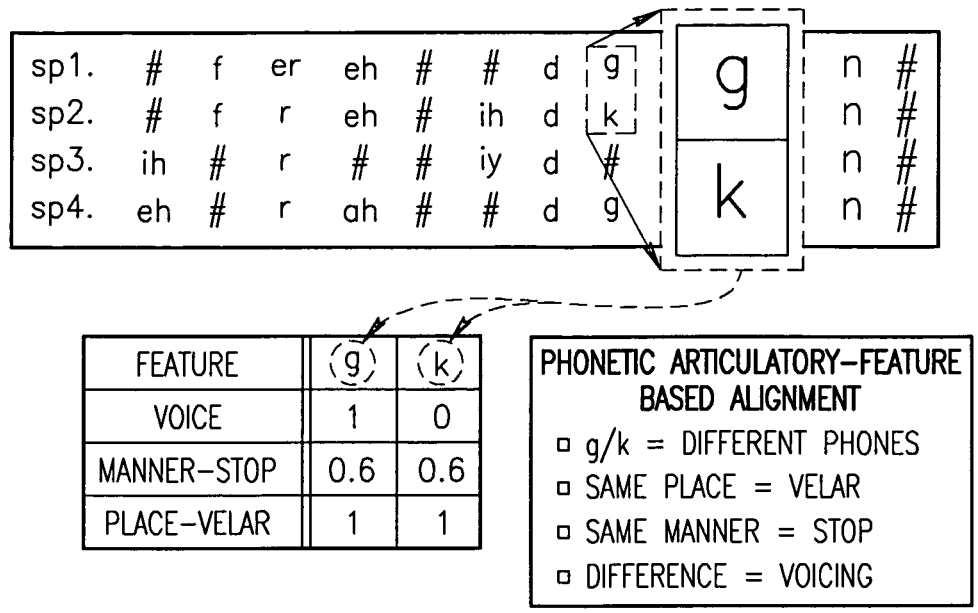
FIG. 9 shows an example of phonetic articulatory-feature based alignment performed using the alignment matrix of FIG. 8.

FIG. 9 shows the system 500 includes a phonemetic articulatory-feature based aligner that compares phoneme hypotheses by feature sets rather then by phoneme name. Instead of assigning the phoneme match between g and/or k an absolute score of 0, because they are not the same phoneme, it will instead assign them a metric or otherwise grade them to take into account that they are identical in all articulatory features except voicing. The articulatory-feature based aligner does not insist that phonemes must be spelled the same way in order to match. Thus g and/or k are aligned because they are both velar stops and/or differ solely in that one is voiced while the other is not voiced.

When the alignments of letter-to-sound handwritten phoneme sequences and/or speech phoneme sequences are close enough, then system 500 treats the respective handwritten and/or spoken inputs as being possibly redundant. The next step in processing is to use the information embedded in the alignment matrix to better model the phoneme sequence transitions that are possible—that is, given one phoneme what is the most likely next phoneme based on information in the phonetically aligned columns of the alignment matrix.

Figure 10:
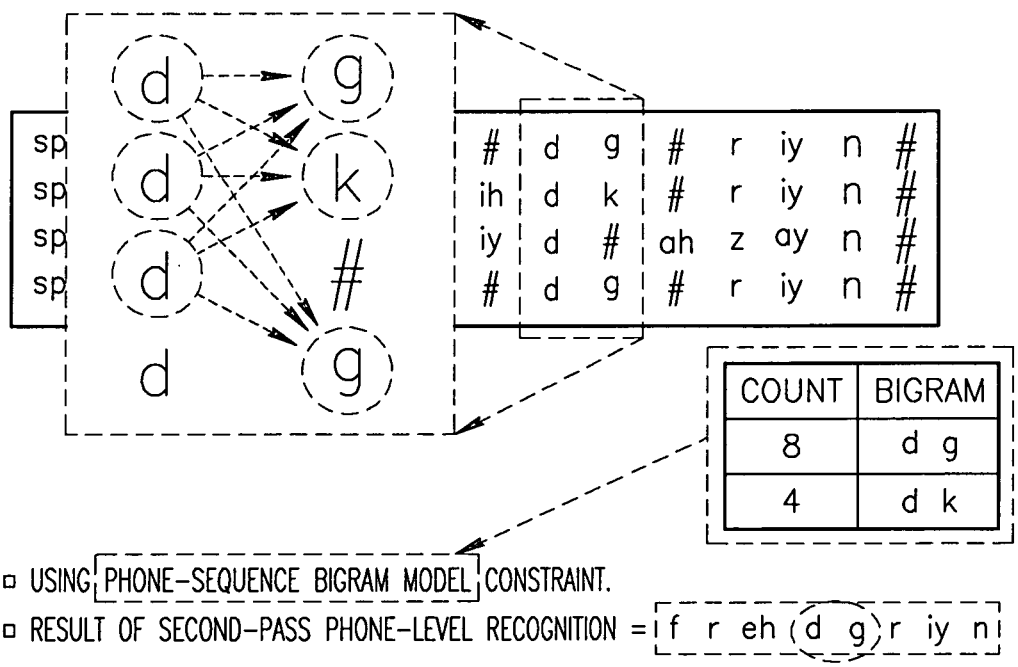
FIG. 10 shows an example of a phoneme sequence bigram model derived from the alignment matrix of FIG. 8.

For example, FIG. 10 highlights the alignment matrix columns that represent the transition from the final phoneme of the word Fred to the first phoneme of the word Green. There is some ambiguity as to whether the first phoneme of the word Green is g or k. Counting the phoneme bigrams across rows at this transition point yields a table of bigram counts. The count of d-g bigrams is 8, while the count of d-k bigrams is 4. Based on these bigram statistics it is more likely that the first phoneme of the word Green is g or not k.

FIG. 10 shows a resulting bigram sequence model used for the entire alignment matrix to constrain a second pass phoneme-level recognition of the speech. The system 500 uses cross-row phoneme sequence information from the alignment matrix to create a bigram phoneme sequence model that combines information from both handwriting and/or speech phoneme sequences to resolve ambiguous transitions from the last phoneme of Fred to the first phoneme of Green. In the illustrated example, the second pass recognition yielded a correct pronunciation of the term Fred Green. The articulatory-feature based alignment of the combined inputs correctly discovered the redundancy and provided enough acoustic information to extract the correct pronunciation, which is one advantageous benefit of leveraging multimodal redundancy. The redundant modes offer complementary information, which when properly combined will yield better recognition than is possible in either mode alone.

Figure 11:
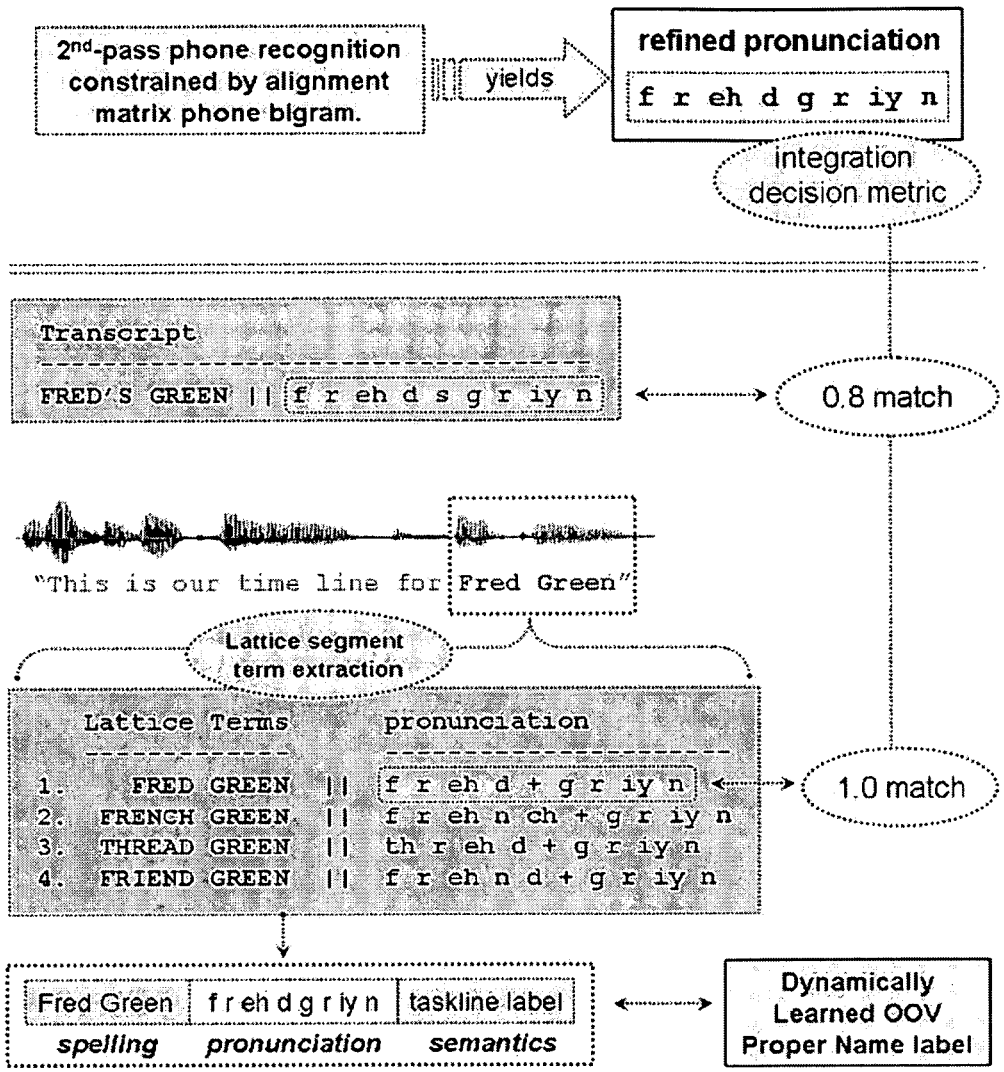
FIG. 11 shows a second pass phoneme recognition process that yields an integration decision metric, which is then used to selectively score and produce a best-fit term corresponding to the temporally related speech and writing input from FIG. 6.

FIG. 11 shows the refined pronunciation produced by constrained second-pass phoneme recognition may be used as an integration decision metric against which to measure interpretations from all input sources. The closest sources are chosen to represent the spelling and/or pronunciation of the new word, which happens to be Fred Green in the illustrated embodiment. Comparisons are shown for the speech transcript (non-matching), versus word sequences extracted from the temporally corresponding segment of the speech recognizer's lattice—which in the illustrated example results in an exact pronunciation match.

The refined pronunciation resulting from the constrained second-pass phoneme recognition may be utilized by the system 500 to integrate and leverage the multimodal redundancy. That refined pronunciation is used as a metric against which to measure hypotheses from all input sources. When the refined pronunciation is compared against the transcript, it does not match exactly. Thus, in one embodiment it may be possible to use temporal boundary information from the alignment matrix to choose a segment of the transcribing speech recognizer's lattice from which local word sequences will be extracted. By way of example, when the refined pronunciation is compared against those extracted local word sequences that are acoustically most similar then an exact match may be found, which in turn operates as strong evidence that, Fred Green, was in fact what was spoken and/or written. At this point, the new term, to include, but not limited to its correct spelling, pronunciation and/or semantics, may be dynamically enrolled in the system 500.

Figure 12:
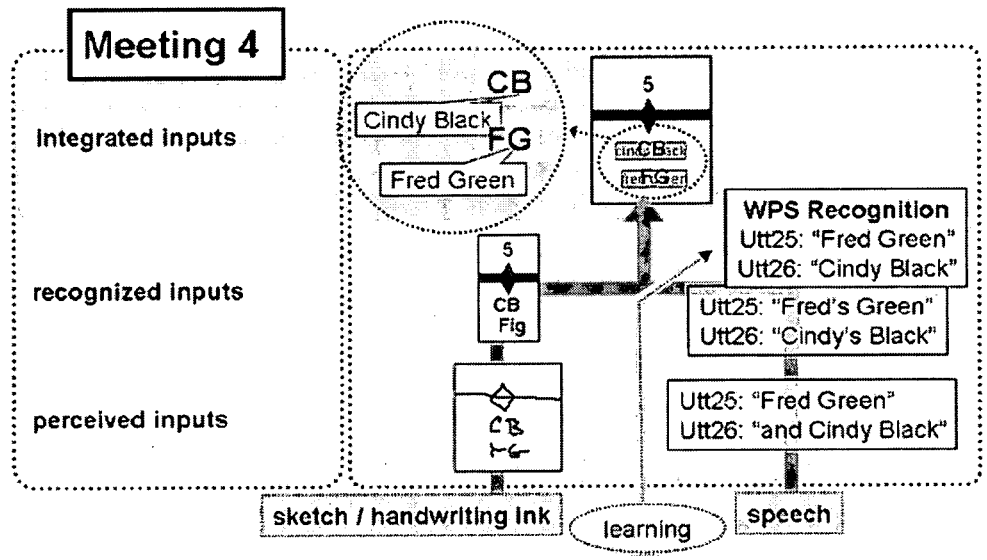
FIG. 12 is a diagram of sketched input and written input consisting of abbreviations received by the system of FIG. 5.

FIG. 12 shows that multimodal redundancy may be utilized by the system 500 to learn abbreviations or acronyms. In this illustrated example, the names Fred Green and Cindy Black were enrolled into the system during previous meetings or communication activities.

In the illustrated embodiment, the written and speech inputs are initially identified by the system 500 as perceived inputs. A facilitator or user writes a diamond shaped milestone on a chart formed on an ink-sensitive whiteboard and then writes two abbreviations below it (i.e., CB, FG), while temporally saying the terms, "Cindy Black" and "Fred Green," or vice versa. Given these inputs and/or the previous enrollment of Cindy Black and/or Fred Green the system 500 corrects and/or expands its understanding of the abbreviations.

The written inputs include the sketch/handwriting ink received on an ink-sensitive surface, which in this case is shown as a diamond shaped chart milestone symbol written on a task-line proximate the two hand-lettered abbreviations, FG and CB. The speech inputs are the terms, "Fred Green," and "Cindy Black.". After being processed by one or more of the recognizers 510-520 (FIG. 5), the perceived inputs are recognized as recognized inputs. However, in the illustrated embodiment, the handwriting recognizer gets the letter sequence for CB correct, but the letter sequence for FG wrong. At this point, the system 500 may not appreciate what relationship these abbreviations may have to the two spoken utterances. Thus, the abbreviation letter sequences are ungrounded.

Both proper name utterances shown in FIG. 12 as recognized inputs are unrecognizable sequences for the transcribing speech recognizer because neither are listed as two-word names in either of the dictionary or language model of the transcribing speech recognizer. As such, the initial approximation of the terms from the transcribing speech recognizer results in the terms, Fred's Green, and Cindy's Black, which are both incorrect. However, in this illustrated example, both proper names were enrolled earlier by the system 500, as described above, so both OOV names may be correctly recognized by the Word/Phrase-Spotter 514 (FIG. 2) as shown in the WPS Recognition box.

The Word/Phrase-Spotter 514 recognizes the terms Cindy Black and Fred Green. Accordingly, the system 500 initiates a search for temporally nearby writing in an attempt to associate the spoken terms with any written terms that may be found. In the illustrated example, the integrated inputs shows that the system 500 has made an association between the written terms CB and FG, which are first-letter abbreviations of the spoken, newly enrolled proper names. Additional details and examples are provided below.

In the above-described embodiments, the system 500 may employ a process of learning abbreviations, which may be referred to as Multimodal Semantic Acquisition. The learned semantics carried in one mode, like spoken proper names, may be dynamically acquired by new symbols in another mode, which may be handwritten abbreviations. Thus, unknown, written abbreviations, which are redundantly communicated, may grounded by acquiring their expanded meanings from previously enrolled terms.

The system 500 includes at least three main functionalities identified herein as (1) alignment, (2) refinement; and (3) integration. The alignment module 522 uses an articulatory-feature based alignment mechanism for detecting redundancy. Phonetically close alignments of speech and/or letter-to-sound transformed writing are processed as possible redundancies. The refinement module 524 uses a phoneme-bigram sequence model derived from the alignment matrix and produces a refined pronunciation hypothesis for a new term. Even when neither individual input mode yields the correct pronunciation alternative, information from multiple communication modes may be combined into the alignment matrix described above, which may then be refined to recover the correct pronunciation. The integration module 526 uses the refined pronunciation as an integration decision metric against which to compare other inputs. The integration module 524 selects a best combination of spelling and/or pronunciation. Integrating information from multiple communication activities, such as speech, writing, and gestures, permits the system 500 to more closely and more accurately find a best-fit for OOV terms, abbreviations, etc. than is possible with using one type of recognizer 510-520 alone.

Briefly referring back to FIG. 5, the system 500 may observe and receive speech, writing and/or gestures as communication activity inputs with the speech receiving device 502, the writing, sketching, and/or typing receiving device 504, and the gesture viewing device 506. The segmentation processor 508 processes the received input and segments it according to predetermined language rules. For example, the segmentation processor 508 may segment the speech into spoken utterances separated by areas of non-speech audio. The segmentation processor 508 may also segment the written input into sketching and writing segments (referred to hereinafter as writing segments).

The speech may be received by one or more speech recognizers, such as but not limited to: (1) a word-level speech recognizer 510, which may referred to as a transcribing recognizer 510 because it transforms audio input into textual transcriptions, (2) at least one, but preferably an ensemble of, phoneme or phoneme-level speech recognizers 512, and/or (3) a word/phrase enrolled-word spotting recognizer 514. The phoneme-level speech recognizers 512 transform the audio input into a sequence of phonemes and route those to a multiparser 528. In addition, the results of the writing, sketching, and/or typing receiving device 504 and the gesture viewing device 506 may be routed to the multiparser 528. In one operational embodiment, the multiparser 528 applies temporal constraints to filter the possible combinations of phoneme sequences and the writing segments, which in turn may form the constituents of rules that define how such sequences and segments combine to layout and/or label a schedule chart.

The phoneme sequences and writing segments, after being combined, may then be routed to a processing module 521, which returns a ranked list of possible constituents. The constituents, as described above in some of the examples, are then processed by the alignment module 522, the refinement module 524, and the integration module 526. In one embodiment, the possible constituents may be further processed in the multiparser 528. After processing in the above-identified modules, the results are routed to an enrolled new word database 530 and may optionally be routed to a display module 532. The enrolled new word database 530 may communicate with the word/phrase enrolled-word spotting recognizer 514 such that the newly enrolled word, term, phrase, symbol, etc. may be more readily recognized when subsequently spoken or written.

In order to leverage the occurrence of multimodal redundancy the system 500 must first detect it. Often, a speech event accompanied by a writing event may occur in such a way that a spoken term or phrase of interest is embedded in a long speech utterance. Hence, the alignment module 522 operates to align predetermined segments of the writing and the speech to detect closely matching segments.

Often times, written words are not necessarily OOV proper names, but yet are still susceptible to being mis-recognized by writing and speech recognizers. Thus, the system 500 combines sub-word unit recognition with word-based recognition. The word-level recognizer 510 operates in parallel with one or more of the phoneme-level speech recognizers 514.

In one embodiment, the system 500 includes four phoneme-level speech recognizers 514, each constrained differently. In addition, both phonemes and syllables may be used as sub-word units or segments. The transformation from syllables to phoneme sequences is trivial because the phoneme-level speech recognizer 514 names syllables by their respective phonemetic pronunciation sequences (e.g., cat="K_AE_T"="K AE T"). In one embodiment, the constraints for the four phoneme-level speech recognizers 514 are: (a) syllables follow a grammar of English syllabic sequencing; (b) phonemes follow a grammar of English phoneme sequences; (c) any syllable will follow any other with equal likelihood; and (d) any phoneme will follow any other with equal likelihood.

Figure 13:
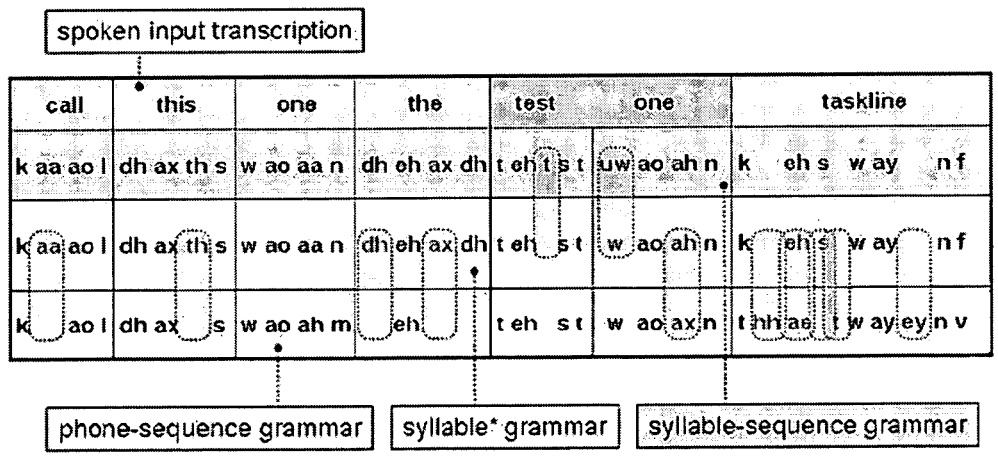
FIG. 13 is a table of phoneme sequence outputs taken from different phoneme recognizers employed by the system of FIG. 5.

FIG. 13 illustrates some of the various phoneme sequence recognition outputs and/or their alignment with respect to each other. For the four different recognizers referred to above, as follows: (bottom row) unconstrained phoneme-sequence, (middle row) unconstrained syllable sequence grammar (the *, or star, means that any syllable will follow any other, and (top row) constrained syllable sequence grammar).

One purpose for using multiple phoneme recognizers is that phoneme recognizers have been known to have high error rates, so each recognizer in the system 500 is constrained differently. Advantageously, such constraints may more accurately provide the correct phonemes and/or phoneme sequences at each position in FIG. 13. The system 500 extracts the phonemetic information from an alignment matrix by means other than a simple majority vote at each position. In one embodiment, a positional bigram model of phoneme sequences is extracted from the alignment matrix. The positional bigram model constrains a second pass phoneme-level recognition, which is described in more detail below. Both the existence of phonemes in the matrix and/or their positions relative to each other is taken into account by the positional bigram model. During the second pass phoneme recognition, information from the alignment-matrix, as derived from the positional bigram model, is weighted in relation to phoneme-level acoustic scores. This weighting serves to scale the scores of the positional bigram model in relation to the acoustic model scores, so that scores from one model do not overwhelm the scores from the other model. In speech recognition this weighting is called the language model scaling factor, and/or is usually determined by empirical trial. Thus, rather than a majority vote of which phonemes are best in which positions, the system 500 uses both an alignment-based phoneme sequence information and acoustical information to create a refined pronunciation. The second pass recognition refines the pronunciation hypothesis.

Another purpose for using multiple phoneme recognizers is that individual phonemetic time boundaries must be known. Using longer sub-word units (like syllables) provides better phoneme-level recognition accuracy; but, within-syllable phonemetic time boundaries are not easily recoverable. In one embodiment, the system 500 uses both syllable and individual phoneme based recognizers. For syllable-based phoneme recognizers, the within-syllable phoneme transitions may be roughly estimated by simple interpolation with respect to the syllable start and/or end times. For individual phoneme recognizers, the temporal information for phonemetic boundaries may be fully available. During processing, the system 500 discounts the within-syllable temporal phoneme boundaries and primarily depends on temporal boundaries from the individual phoneme recognizers. Thus, the multiple phoneme recognizers support both syllable-based phoneme recognition for higher accuracy and individual phoneme-level recognition for better temporal boundary resolution.

The sketch recognizer 516 may take the form of a NISSketch™ brand sketch recognizer from Adapx, Inc. or a Microsoft® handwriting recognizer. Successful sketch and/or writing recognition are dependent on correctly segmented input. For example, if sketch strokes are grouped together with handwriting strokes then the sketched strokes may be interpreted as handwriting and/or vice versa.

Figure 14:
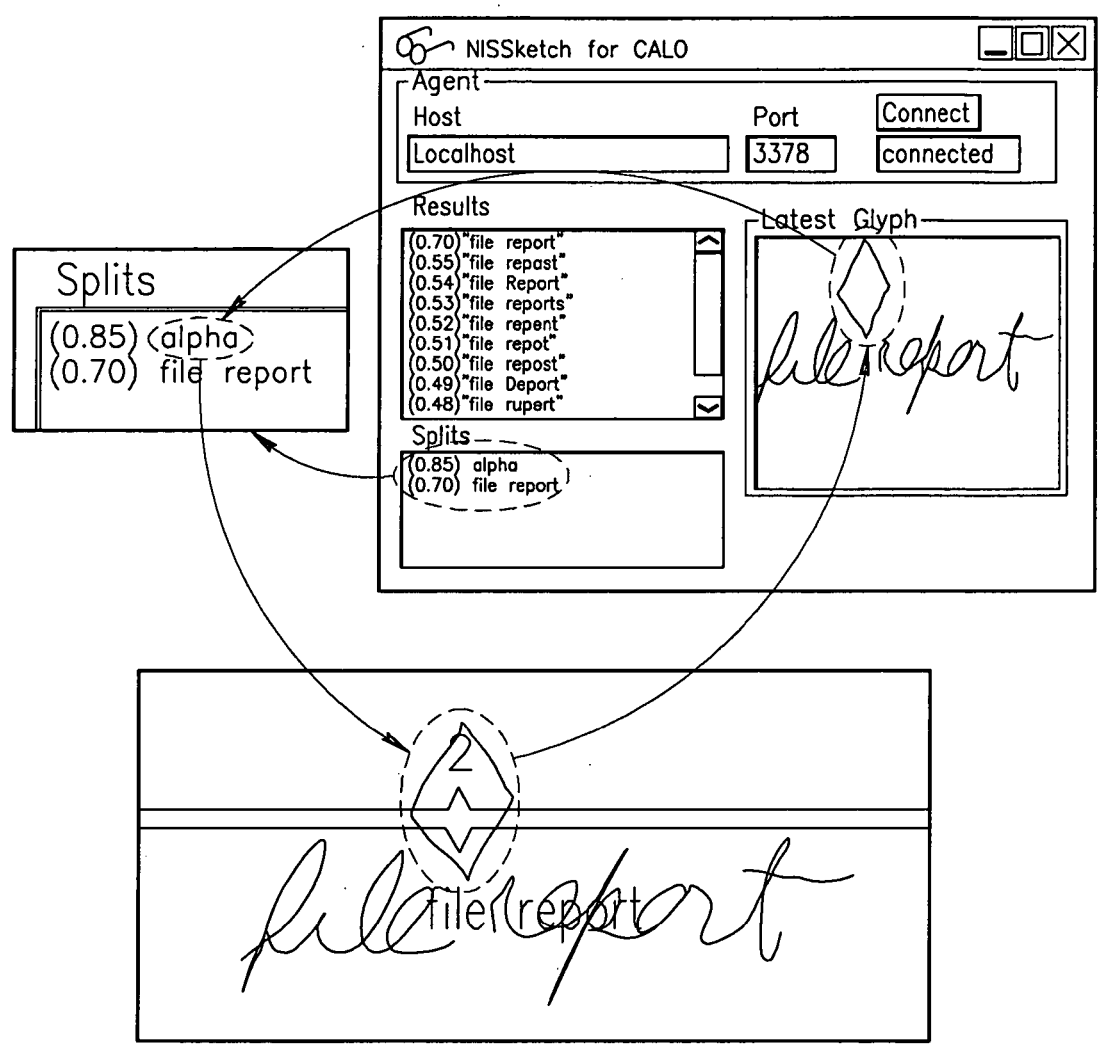
FIG. 14 is a diagram showing a segmentation process to distinguish written symbols from written text received by the system of FIG. 5.

By way of example as shown in FIG. 14, the sketched strokes representing the highlighted milestone diamond/alpha symbol will need to be segmented from the handwritten phrase "file report" written below the symbol. In this example the diamond/alpha was drawn and then the phrase "file report" was temporally handwritten below it.

To accomplish handwriting and/or sketch recognition, the segmentation processor 508 separates the sketch and handwriting into components or segments. The segmentation operates to distinguish handwriting from the other sketch constituents, such as but not limited to chart axes, lines, milestone-diamonds, cross-outs, etc. In one embodiment, an ink stroke may be defined by a sequence of two-dimensional coordinates, such as Cartesian X-Y coordinates, that trace a position of a writing instrument tip from its initial contact with the ink-sensitive surface until its disengagement from the ink-sensitive surface. Some ink strokes features that may be are tracked are: (1) individual stroke size relative to screen size, (2) stroke closeness to the previous stroke, (3) horizontal relation to previous stroke group, (4) vertical relation to previous stroke group, (5) height/width ratio of stroke group's bounding box dimensions, and/or (6) temporal distance from a previous stroke.

The individual stroke size relative to screen size may effectively filter out the large chart axes from other ink strokes because the axes are constructed as a single stroke that traces out a large "L" shape. Also, the axes may roughly define the boundaries of the chart. The stroke closeness to the previous stroke may be used to hypothesize word breaks. In one embodiment, the stroke closeness treats all horizontally contiguous strokes as part of the same group and permits the handwriting recognizer 518 to hypothesize word breaks within a group. The horizontal relation to previous stroke group includes all strokes that are (a) relatively close to the previous stroke, (b) do not precede the previous stroke beyond some threshold of distance, and (c) do not either start below or extend too far below the bounding box of the previous stroke group are considered an extension of the previous stroke group. The vertical relation to previous stroke group includes a stroke that is below the previous stroke group and which starts a new group, triggering recognition on the previous group. The height/width ratio of stroke group's bounding box dimensions includes groups of handwriting strokes characteristically maintain a height/width relationship. If the group is too compressed or extended either horizontally or vertically beyond a normal range for handwriting, then it may be recognized as sketching rather than handwriting. For example, a horizontal line (which could be a task-line or cross-out stroke) will typically have a very low height to width ratio that distinguishes it from handwriting. However, sending such a stroke group to the handwriting recognizer 518 may be recognized as low-confidence handwriting. The temporal distance from previous stroke may be used to determine when the time after the previous stroke exceeds a threshold, which in turn triggers recognition on the previous stroke group.

Figure 15:
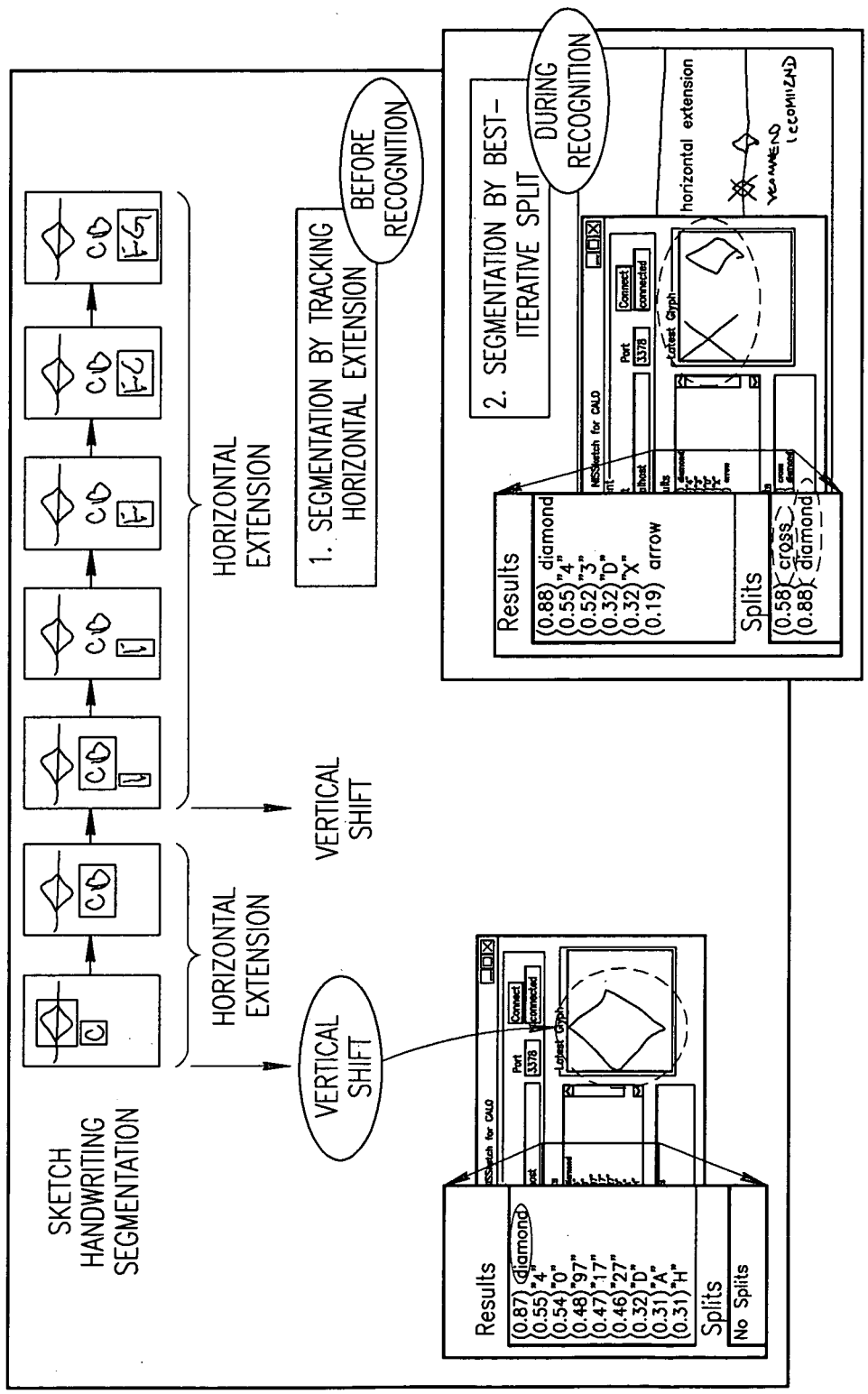
FIG. 15 is another diagram showing additional details of the segmentation process from FIG. 14.

FIG. 15 shows how tracking vertical shifts and/or horizontal extensions of the bounding areas of accumulated ink strokes helps to inform the segmentation processor 508 of constituent boundaries. Thus single lines of handwriting (perhaps prep ended by small symbols like a cross-out or milestone diamond) may be reliably segmented.

In one embodiment, the segmentation processor 508 may use stroke size for distinguishing handwriting ink from the sketch ink, particularly when smaller chart symbols (e.g., tick-marks, cross-outs, and/or milestone-diamond symbols) are used in charts. Given that concatenations of non-handwriting symbols will occur with handwritten terms and phrases, the segmentation processor may identify such a concatenation as a single input segment for recognition. In addition, the sketch recognizer 516 may perform an iterative best-split search on all incoming ink segments, specifically looking for instances in which the first 1-4 strokes will be better recognized as a separate, sketched symbol. In one embodiment, the ink segmentation techniques are heuristic and preferably used with respect to sketched and written inputs made on a chart.

The system 500 uses a dynamic programming matching technique as opposed to a vector space model (VSM) technique for word-spotting redundancies across writing and/or speech. In one embodiment, the system 500 uses exhaustive dynamic programming (DP) searches to discover redundancies and a sampling of spoken utterances that may be examined are predetermined based on computational capacity. By way of example, the sampling may include five utterances temporally preceding the moment at which the DP search starts. Advantageously, the system 500 performs cross-domain matching between writing, speech and gestures or some sub-combination thereof.

One purpose of the multiparser 528 is for temporal grouping. It groups phoneme ensemble outputs together by examining their time stamps. It then examines the time stamps of incoming handwriting recognition alternates lists and/or proposes combinations of those phoneme ensemble output groups and/or handwriting recognition alternates lists whose time stamps are within some temporal threshold of each other. These proposed combinations are then routed to the alignment module 522, refinement module 524, and the integration module 526, which may hereinafter be referred to as ARI module 527 (FIG. 5). The multiparser 528 requests that the ARI module 527 test the combination for the occurrence of handwriting/speech redundancies, and/or return a ranked list of spelling/pronunciation/semantics tuples for any hypothesized redundant terms.

When the ARI module 527 receives the request for alignment from the multiparser 528, it attempts to activate the transcript and/or lattice information for the utterance associated with the phoneme ensemble outputs. A sliding window of previous utterance information is maintained that serves as the system's 500 short-term memory. If the phoneme ensemble's utterance is within that window (currently set to the previous five utterances) then activation of transcript and/or lattice information is effected by reading the appropriate files into active memory structures. One purpose of such alignment is to judge whether the handwriting was spoken redundantly within the utterance with which the multiparser 528 has paired it in the request for alignment. If it turns out that a local alignment is found that is close enough then the inputs are judged to be redundant.

Judging whether the speech and/or handwriting included in a request for alignment from the multiparser 528 includes checking for a transcript match of handwriting letter-string alternatives to terms in the word-level speech recognizer 510 (herein after referred to as the large vocabulary continuous speech recognizer (LVCSR)). If there is an exact match then the redundancy judgment is trivial and subsequent processing is reduced to exploring alternative pronunciations present in the phoneme ensemble outputs, which might help in dynamic pronunciation adaptation. If there is no exact match then the handwriting and speech are phonetically aligned with each other. FIG. 16 shows a phonemetic alignment matrix based on articulatory-feature distance: (a) letter-to-sound phoneme sequences from handwriting recognition, (b) ensemble speech recognition phoneme sequence outputs, (c) handwriting letter-to-sound aligned segment, which is accurately time-bounded within the larger utterance.

To perform the alignment, the system 500 uses a phonemetic articulatory-feature based alignment technique that measures phonemetic distance by performing speech recognition on a training corpus, and/or then building a statistical model of the frequency with which one phoneme is mis-recognized as another phoneme. A phoneme-to-phoneme matrix is then constructed in which these statistics regarding phonemetic distance are stored in a so-called confusion matrix. One possible advantage of using a confusion matrix is that it may be data driven or recognizer specific, in which the latter may have to be constantly recomputed by the system 500. In one embodiment, the confusion matrix may be developed using an ALINE approach because the manner of articulation (e.g. stop, affricate, fricative, approximate, high/mid/low vowel) of two phonemes is generally more optionally advantageous in comparing them than considering their respective nasality or roundness.

In the ALINE approach, some articulatory features are binary-roundness, voicing, syllabic, retroflex, lateral, aspirated, nasal. Some features are categorical-manner [stop, affricate, fricative, approximate, high/mid/low vowel], height [high, mid-high, mid-low, low], backness [front, central, back], and/or place [bilabial, labiodental, dental, alveolar, retroflex, palato-alveolar, palatal, velar, uvulae, pha yngeal, glottal]. Vowels and/or consonants have different sets of active features. Each type in the sub-category set (in [italics]) of each of the four major features (manner, height, backness, place) has an assigned saliency weight based on empirical linguistic measurements The system 500 modifies the ALINE approach to utilize four rather than three sub-categories, or in parallel adds a fourth vowel type to the manner feature. So where ALINE approach includes high, mid and/or low manner features, the system 500 includes very_high_vowel, high_ vowel, low_vowel and/or very_low_vowel manner features.

Figure 18:
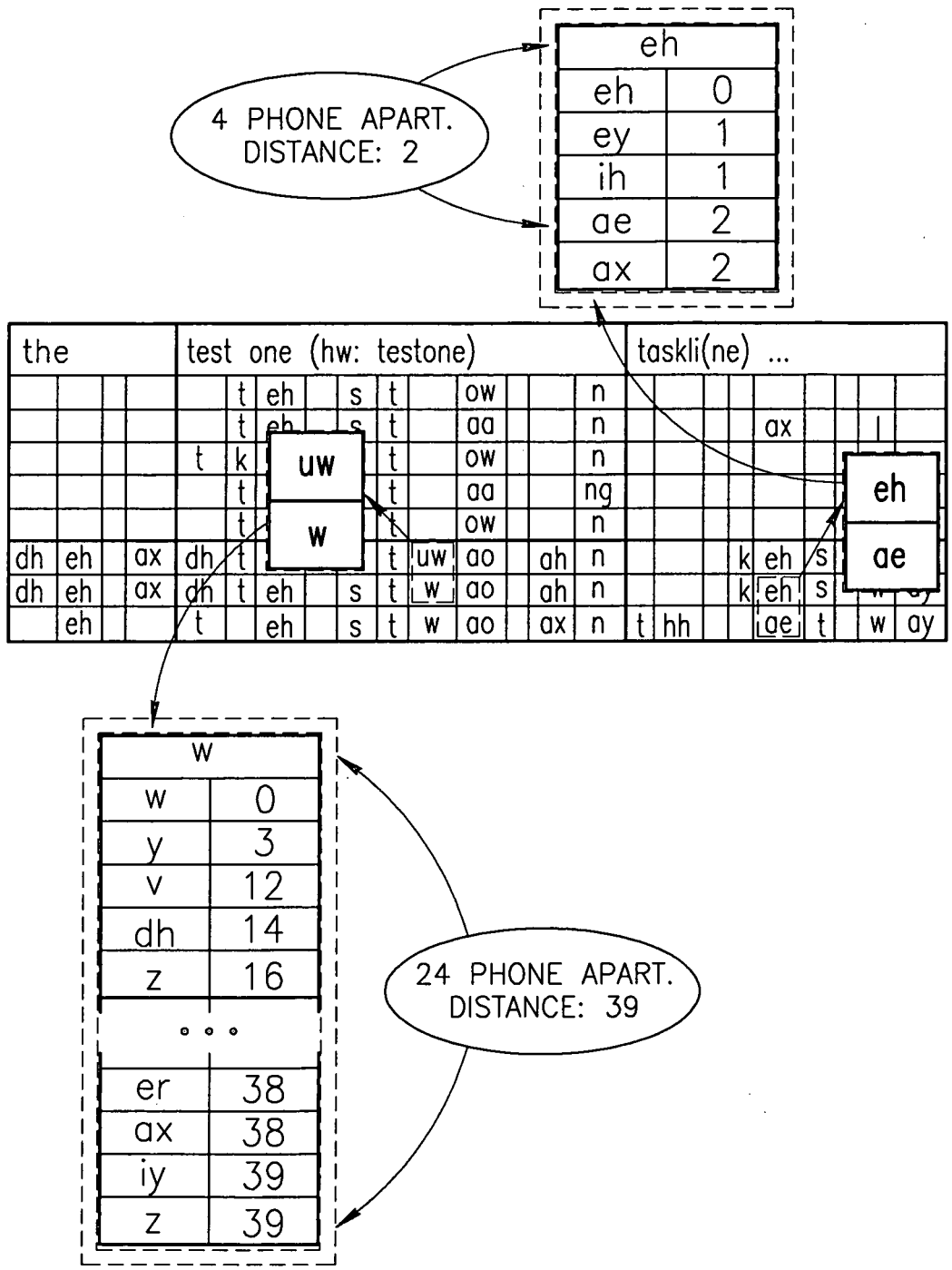
FIG. 18 is a table showing articulatory feature distance scores derived from the articulatory feature table of FIG. 17.

The alignment module 522 compares phoneme hypotheses by feature sets rather then by phoneme name, so instead of assigning the phoneme match between d and/or t an absolute score of 0 because they are not the same phoneme it will instead assign them a metric that takes into account the fact that they are identical in all articulatory features except voicing. Two further examples of how phonemetic articulatory-feature-based alignment works are the eh/ae and/or w/uw alignments shown in FIGS. 18 and 19. FIG. 17 shows an articulatory-feature table having areas of similarity for eh/ae and/or w/uw alignments. The eh/ae pair differs mostly in manner and/or height, while the w/uw pair differs in manner, place, longness and/or roundness. FIG. 18 shows two partial phoneme-distance lookup tables for eh/ae and/or w/uw alignments. The eh/ae pair are much closer together phonetically than the w/uw pair.

The partial articulatory feature table in FIG. 17 illustrates several areas of comparison. For example, both eh and/or ae are syllabic (by virtue of being vowels), and/or both are also voiced. As well, they are close in terms of their manner of articulation—eh being a low and/or ae being a very low vowel. They are close in their backness with both being front vowels. The scores from this articulatory feature table, as well as salience values to bias the weight put on each comparison, yield the phoneme-distance lookup tables shown in FIG. 18. In FIG. 18, the AE phoneme is 4 phonemes (out of 40) away from EH phoneme, while the UW phoneme is 24 phonemes away from W phoneme with a correspondingly larger distance score.

In one embodiment, the system 500 aligns all handwriting letter-to-sound (letter-to-sound) alternatives against each other first, before aligning them with the phoneme ensemble outputs. This yields a matrix of alignments like the upper and lower tables shown in FIG. 19. These two tables illustrate the point that depending upon which phoneme sequence is used as the first or seed phoneme sequence (e.g. a-9 in the upper example and/or a-10 in the lower example) different alignment matrices result. These alignment variations may affect the coherence of the handwriting/speech alignment matrices-discussed below.

After aligning the handwriting (handwriting) alternatives as a block, each phoneme ensemble sequence in turn is then aligned against these handwritings as shown in the upper and lower tables of FIG. 20. The resulting alignments may be characterized by a measure referred to as coherence, which compares phonemes within columns of the alignment matrix with a phoneme-to-phoneme articulatory-feature based distance metric. FIG. 20 shows example alignments of the block of letter-to-sound handwriting transformations (rows preceded by _ _ _) from FIG. 19 with the phoneme ensemble alternatives (rows preceded by ss_labels). The varying alignments resulting from different seed sequences result in different coherence measures (upper right of each alignment block).

The summed and/or averaged distances obtained from the coherence measuring procedure will be used to characterize the entire matrix. A matrix in which every row is exactly the same and/or all rows line up perfectly will be completely coherent. Thus it will have a coherence score of 1.0. Whereas a matrix in which no phonemes on any row align with any other phonemes will be almost completely in-coherent. Thus it will have a coherence score near 0.0.

The top row of the two displays in FIG. 20 each is an index of sequence positions. Each position identifies a column in the matrix, and/or has an associated start frame, which is shown in the sframe row at the bottom of each matrix. Notice that for the more coherent matrix (the upper one) the first phoneme of Joe Browning (i.e., jh) tends to start around frame 12 at position 2, whereas for the less coherent matrix (the lower one) it tends to start around frame 9 at position 1. To estimate the start frame for each position, an average of the start/end frame information from each phoneme ensemble output may be used. For the syllabic ensemble sequences, interpolation may be employed to suggest syllable-internal phonemetic boundaries.

By way of example, FIG. 21 shows a coherent alignment matrix of the handwritten name Joe Browning that was redundantly spoken with the speech "Joe Browning" The alignments in FIG. 20 are not very coherent, and indeed they should not be, because the handwriting for Joe Browning is being aligned against the phoneme-ensemble sequences for the utterance, "Let's . . . ". However, the alignment in FIG. 21 having the handwriting for Joe Browning aligned with the phoneme-ensemble sequences for the speech, "Joe Browning," results in a more coherent matrix (score=0.677. Setting a threshold on the acceptable value of the coherence metric defines a means for deciding whether the aligned handwriting and speech are actually redundant. Low coherence alignments are disregarded. High coherence alignments trigger further processing under the assumption that redundancy may have occurred.

The alignment routine of the alignment module 522 includes a capability to split the alignment of diphthongs in a way that makes sense for the alignment task being performed. Each diphthong has two sub-phonemes of which it is composed. A diphthong's distance from another phoneme will be measured based either on (1) the diphthong's full set of articulatory features or on (2) the set of articulatory features belonging to either one of its sub-phoneme members.

During alignment a diphthong will be expanded to cover the space of its compound members (or of other phonemes that are very close to those compound members) as they occur in other rows of input. For example, the diphthong, ey, shown in the Partial Alignment Matrix in FIG. 22 (line 7), has been expanded in this way. This expansion is shown in close-up in the Select lines from Partial Alignment Matrix section, in which the rows 4, 7, and/or 12 of the Partial Alignment Matrix have been selected, extracted and grouped. The ey diphthong in row 7 has been expanded into component pieces that represent its compound phonemes (first_phoneme=eh, and/or second_phoneme=iy). The expanded pieces are labeled in ways that identify them as part of the ey diphthong while also denoting their roles in the expansion i.e., the first_phoneme/ second_phoneme sequence _ey ey representing the diphthong's compound parts.

The first part of the ey expansion (e.g., _ey) represents the phoneme eh and/or in the Select lines from Partial Alignment Matrix section is aligned below the phoneme ae. In a Partial Section from Phoneme-Distance Table section, the phoneme ae is the closest phoneme to eh. This closeness drives the algorithmic expansion of the diphthong, ey, into its component parts, because the ae/eh closeness scores better than the closeness of ey as a diphthong to any other phoneme in lines 1-6 of FIG. 22. Below the second of ey's compound expansion phonemes (symbolized by ey immediately after _ey) is iy which is an exact phonemetic match to the diphthong's second compound member. In one embodiment, the coherence metric should have such expansions because non-phonemes (e.g. silence or noise—the # symbol) occurring in any matrix match-segment internal columns degrade the coherence. Expanding the diphthongs allows our coherence metric to better take into account the acoustic properties of diphthongs.

For the Joe Browning alignment example in FIG. 21, the spoken utterance, "Joe Browning," and/or the letter-to-sound phonemes from the handwriting input, Joe Browning, were close to the same length. However, this length correspondence is not always the case, as shown in the example matrix in FIG. 23 of which the first 12 frames have been truncated to allow it to fit on this page. In this example, Joe Browning is being aligned with the utterance, "This is our timeline for Joe Browning." So the Joe Browning reference array of letter-to-sound generated phoneme sequences from the handwriting is much shorter than the phoneme ensemble sequences, covering solely positions 20-32 (leaving positions 0-20 unmatched as is appropriate in this case).

In FIG. 23 the speech phonemes in rows 0-3 serve as the reference strings for the alignment, while the handwriting letter-to-sound phonemes in rows 4-8 serve as the hypothesis strings. This mis-match in reference and/or hypothesis string lengths also arises during the handwriting/speech transcript letter-sequence matching task, as shown in the Buy Computer example of FIG. 24. This letter matching task is part of the comparison of the handwriting to the speech. FIG. 23 shows an example of length mis-matched alignment of letter-to-sound phoneme sequences for Joe Browning compared to ensemble phoneme output for utterance, "(This is our time) line for Joe Browning." FIG. 24 shows an example alignment of handwriting letter sequence (a) compared to letter concatenations of the LVCSR transcript (b). This letter alignment is also performed in evaluating the multiparser's request for phonary alignment. Upper-case letters below an underscore are insertions. Upper-case letters below an underscore are insertions. Uppercase letters above an underscore are deletions. Upper-case letters below another upper-case letter are substitutions.

Aside from keeping the handwriting's constituent letters or phonemes close together during the dynamic programming matching routines, the alignment module 522 may also check the finished dynamic programming matrix for the best local matches. For example, FIG. 24 further shows a full dynamic programming finished matrix having the alignment matrix for the handwritten phrase Buy Computer and the output from the phoneme-level recognizer 512 for the associated utterance, " . . . buy computer . . . " In the illustrated embodiment, the phoneme-level hypothesis is shown at the top. The first four phonemes of that hypothesis, which appear in the truncated horizontal axis of the matrix, are underlined. A rough association of the spoken utterance words to the phonemes is given. The vertical axis of the alignment matrix is composed of the top edge of the alignment of the handwriting recognizer's letter-to-sound alternates (labeled 3,2,1), which is listed vertically with ">" signs denoting the top (i.e. rightmost) edge. This edge is shown as the vertical axis of the alignment matrix. Key: D=Deletion, I=Insertion, S=Substitution, _=Correct.

A portion of the full dynamic programming finished matrix includes best-move and/or best-score information. Each matrix cell is labeled by a tuple that shows the best move to that cell along with score of that best move. The move possibilities are I=INSertion, D=DELetion, S=SUBstitution, _ _=_ _ _ _correct. These best-moves and/or best-scores represent all of the information that is typically recorded in the memory structures of the dynamic programming pass. It is possible to implement memory structures that would keep a fuller listing of the matrix, accounting for not solely best-move/best-score information but for all possible scores of all four move possibilities at each matrix cell. However, back-tracing along the edges of the finished matrix (e.g. right-to-left along the bottom row and/or bottom-to-top along the right-most column) may yield a more accurate or even an optimal local path for length mismatched alignments, which may not be the same as a global best path.

Figure 25:
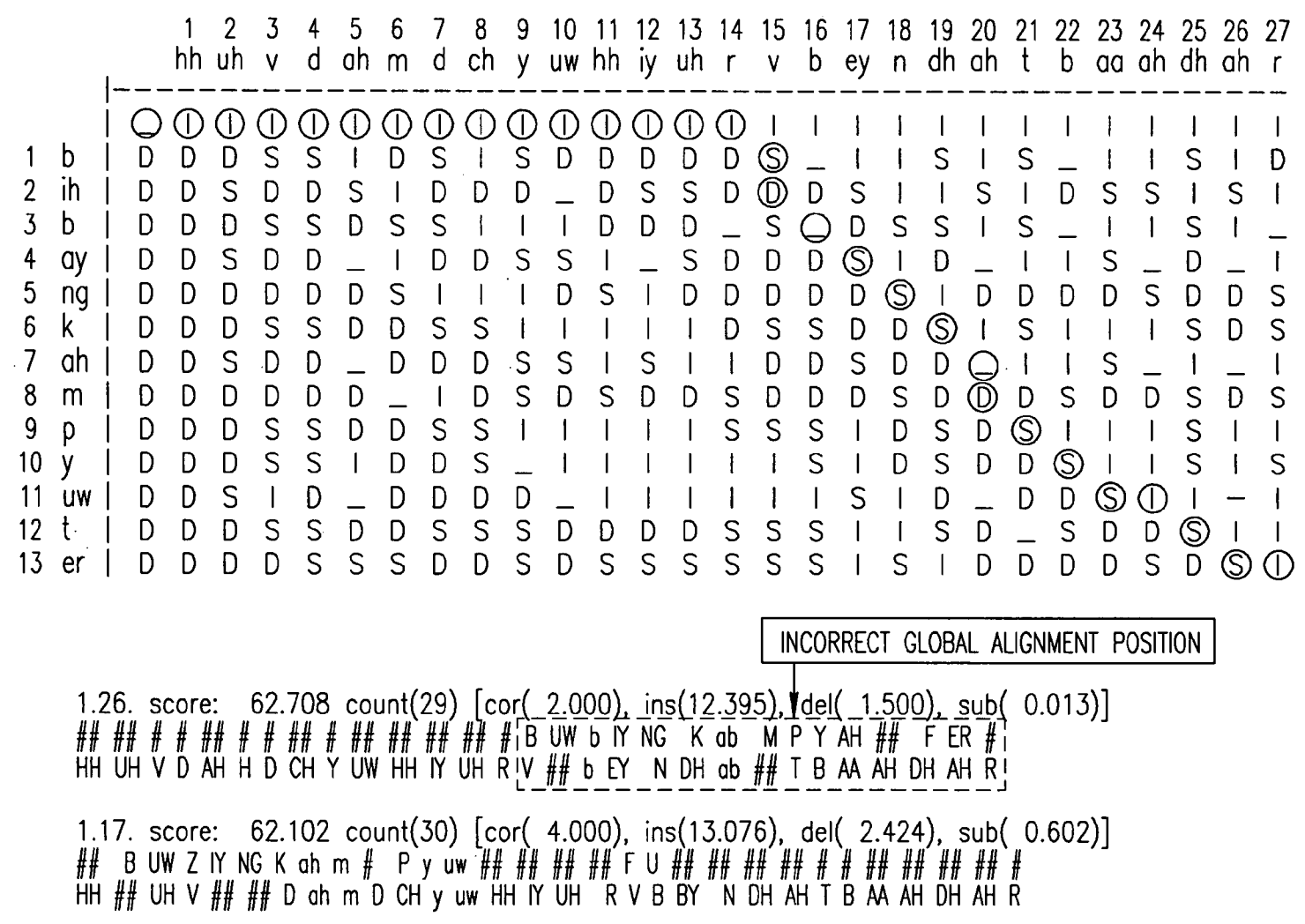

FIG. 25 shows an example of a global best path for length mismatched alignment of letter-to-sound phoneme sequences for Joe Browning compared to ensemble phoneme output for utterance, "This is our timeline for Joe Browning." The circles trace the path of best states backwards from the lower right corner.

The best path through this DP matrix is circled, and the path's score, statistics and/or alignment are shown highlighted below the figure. This is the global best path found by the algorithm. However, it is possible to look for alternative local solutions by iteratively replacing each move on the final column (moving from bottom to top) by a Deletion. Then, as each replacement is made, the best path may be re-computed. Likewise each move along the bottom row (from right to left) will be replaced by an Insertion move, and the best local path may again be re-computed. In performing these deletions and insertions in the matrix, a better scoring local path may be determined.

Figure 26:
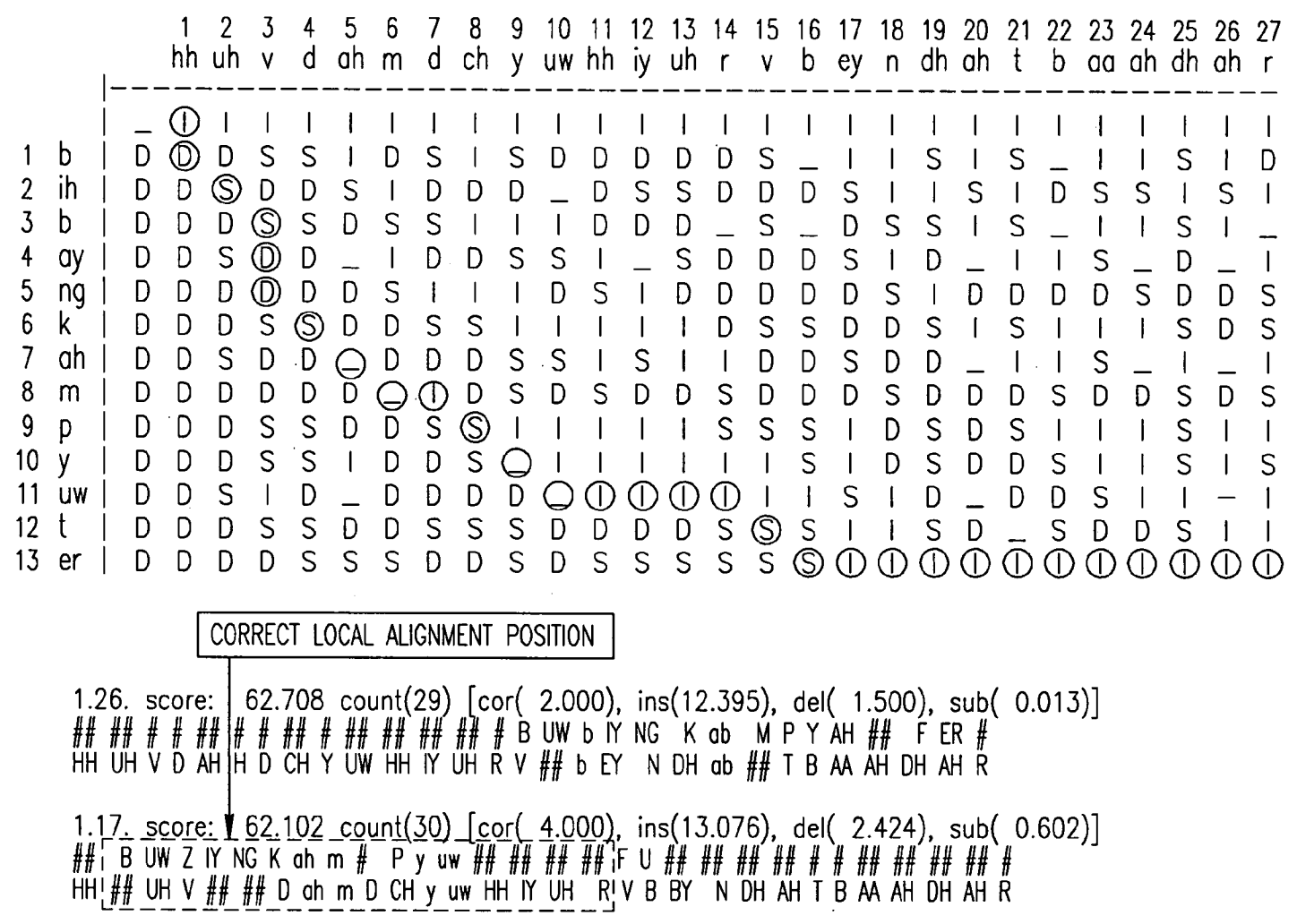

One example of a best local path is shown in the FIG. 26. Lower path scores are better, so the local path score of 62.102 is better than the global score of 62.708. In one embodiment, the statistics show the local path's better score is primarily due to more correct matches. In this case the alignment of the handwritten Buy Computer against the spoken, "Buy computer and/or other," is moved from below the " . . . and/or other" portion of the speech to below the "Buy computer . . . " portion of the speech.

As alignments are being processed, the approximate frame-time of each column position within the alignment matrices may be determined by an averaging mechanism and then cropped by removing phonemetic outliers. These outliers are shown in the pruned area of FIG. 27, which shows a processed alignment matrix for the handwritten word, arrive, and further shows how phonemetic outliers are pruned. The outliers may arise from (a) errors in handwriting recognition, (b) errors in letter-to-sound transformation, or (c) errors that are combinations of these two processes. The outliers are pruned when they are more than a factor of standard deviation away from the main body of the phoneme alignment matrix. The phonemes r ah in row 5 and/or aa, in row 8 (in position columns 19 and/or 20) are all pruned away. Their distance from the main body of the alignment, which is marked off with vertical dividers between positions 24 and/or 28, is about three full positions away—from position 20 to position 24. This exceeds the standard deviation in distances between phonemes that occur within the main alignment body. In this case that standard deviation is between 1-2 positions.

FIGS. 29 and 30 illustrate an alignment matrix with its accompanying phoneme-level timing information. Each line of phonemetic frame-level start times corresponds to the phoneme hypothesis generated from one or more of the phoneme-level recognizers 512. To extract frame-level temporal information, the system 500 averages across all four phoneme timing matrices and temporal phoneme boundaries within syllables may be interpolated. FIG. 28 shows a portion of the phoneme alignment matrix (for handwritten and/or spoken, Joe Browning). Rows 7-9 are the 7th-9th handwriting letter-to-sound hypotheses. Rows 10-13 are ensemble phoneme recognizer outputs. Likewise, FIG. 29 shows the parallel start-frame matrix for the ensemble phoneme recognizers: ssb/ssd use phoneme sub-word units, while ssa/ssc use syllables. The bottom row is the output start frame vector for the hypothesized phoneme positions, averaged over the phoneme sub-word unit recognizers. Note that the syllable sub-word unit recognizers have no unit-internal phoneme segmentations.

After phonetically aligning redundant handwriting and speech, as described above, the next step is to perform a refinement process using second-pass phoneme recognition. In one embodiment, one of the phoneme ensemble recognizers may act as a master phoneme recognizer. Its first function is to produce a phonemetic sequence hypothesis, which is routed to the multiparser where it participates in the alignment process used to discover redundancies. Its second function is to cache the MEL-cepstrum features from the first pass recognition and then re-use them for a fast second pass recognition to refine the pronunciation of any discovered redundancy.

Second pass recognition using cached features is constrained by a phoneme sequence model built from the alignment matrices. The alignment matrix also designates the temporal segment of a spoken utterance that corresponds to the handwriting. This is why finding the optimal local alignment path may generally be preferred. For example, the optimal global path from FIG. 25 defines the temporal segment of speech for second pass recognition to be that segment in which the speaker said, " . . . and/or other," while the optimal local path in FIG. 26 defines the temporal segment of speech for second pass recognition to be that segment in which the speaker said, " . . . buy computer." Second pass recognition on the global path segment (for " . . . and/or other") would likely not find a good phonemetic pronunciation for the handwritten Buy Computer, while second pass recognition on the local path segment (for " . . . buy computer") is more likely to find a refined pronunciation. In addition, the temporal boundaries of a segment will also be used to identify word sequences from the transcribing recognizer's lattice, which may provide further matching evidence in comparison with the handwriting input, as described below.

The system 500 uses an iterative back-off on the segment boundaries, starting with the tightest (which is a slight constriction of the alignment boundaries) and progressively widening the boundaries until a threshold limit of word sequences is reached. For example, for the alignment matrix of Joe Browning as shown in FIG. 30, the top seven lattice extractions and/or the last five lattice extractions out the eighty-five possible word sequences extracted from the lattice are shown in FIG. 31. Because the word, Browning, was not in the dictionary the correct word is not actually present in the lattice; however, there is a lot of phonetic information in the extracted word sequences present in this lattice segment.

FIG. 32 shows a re-ranked extraction sequence in the right-most column labeled Lattice. To take advantage of the phonemetic information in these extracted lattice sequences, they are compared to the handwriting sequences. Based on that comparison they are then re-ranked on the following scales, as follows: (1) the coherence of their phonemetic alignments (see the Cohere column in FIG. 32); (2) their letter and/or phoneme alignment scores (see the LAlign and PAlign columns in FIG. 32; and (3) their spelling closeness, which is measured as the percentage of matching letters between the closest handwriting/lattice-words combination (see the MatchLS column in FIG. 32).

These various scores are combined into a single probability that is computed as a weighted average (see the CombProb column in FIG. 32), by which the lattice sequences are ranked. A threshold on this combined probability determines which of these lattice sequences are themselves grouped and/ or phonetically aligned. Then, as an aligned group, they are aligned against the ensemble speech outputs. This creates further alignment matrices, which will be mined for further phoneme sequence information to constrain second pass recognition.

Figure 33:
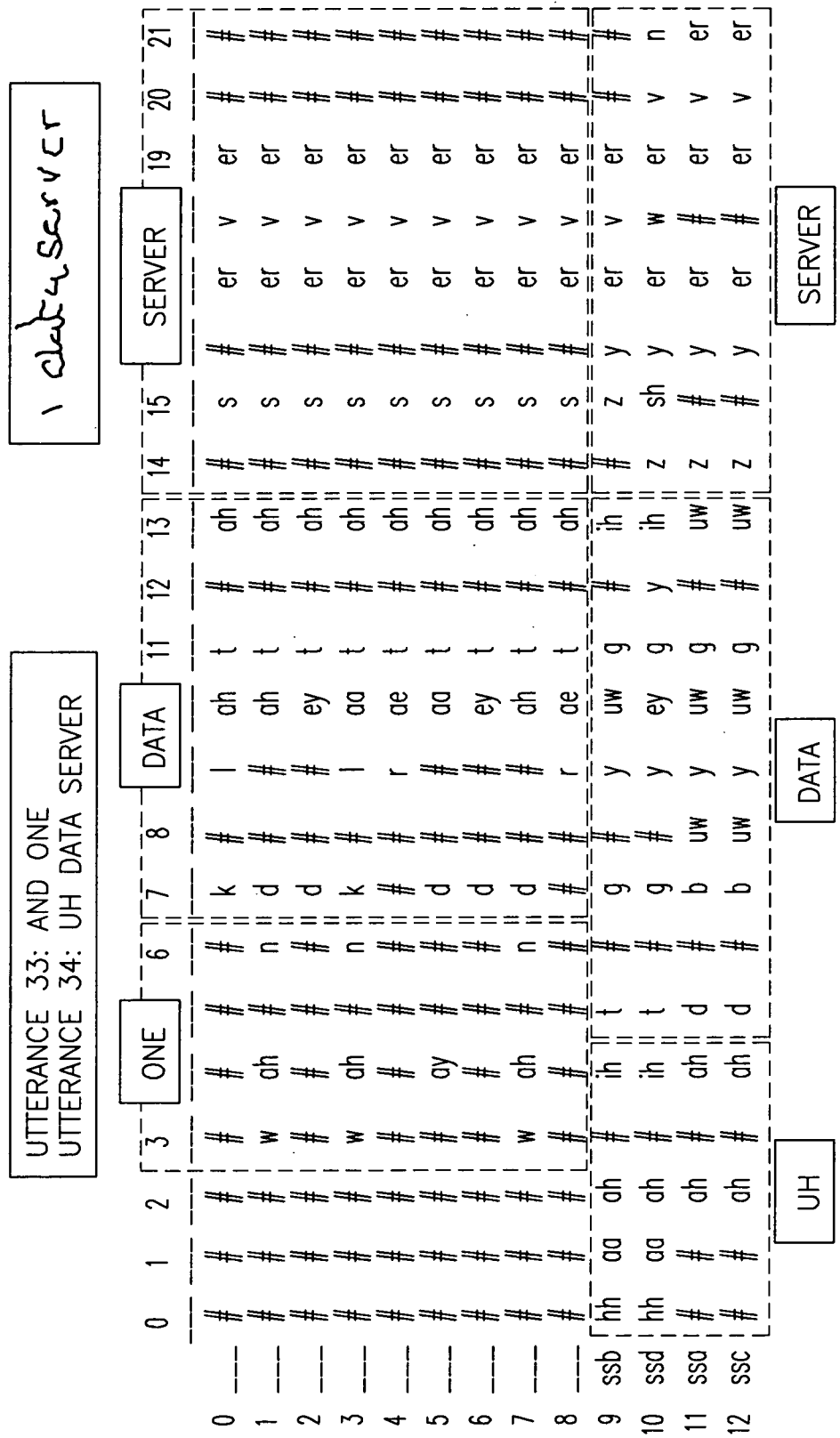
FIG. 33 is a positional phoneme-bigram modeling table showing a phonetic alignment between speech and written information from an example phrase identified as "1 dataserver;"
Figure 34A:
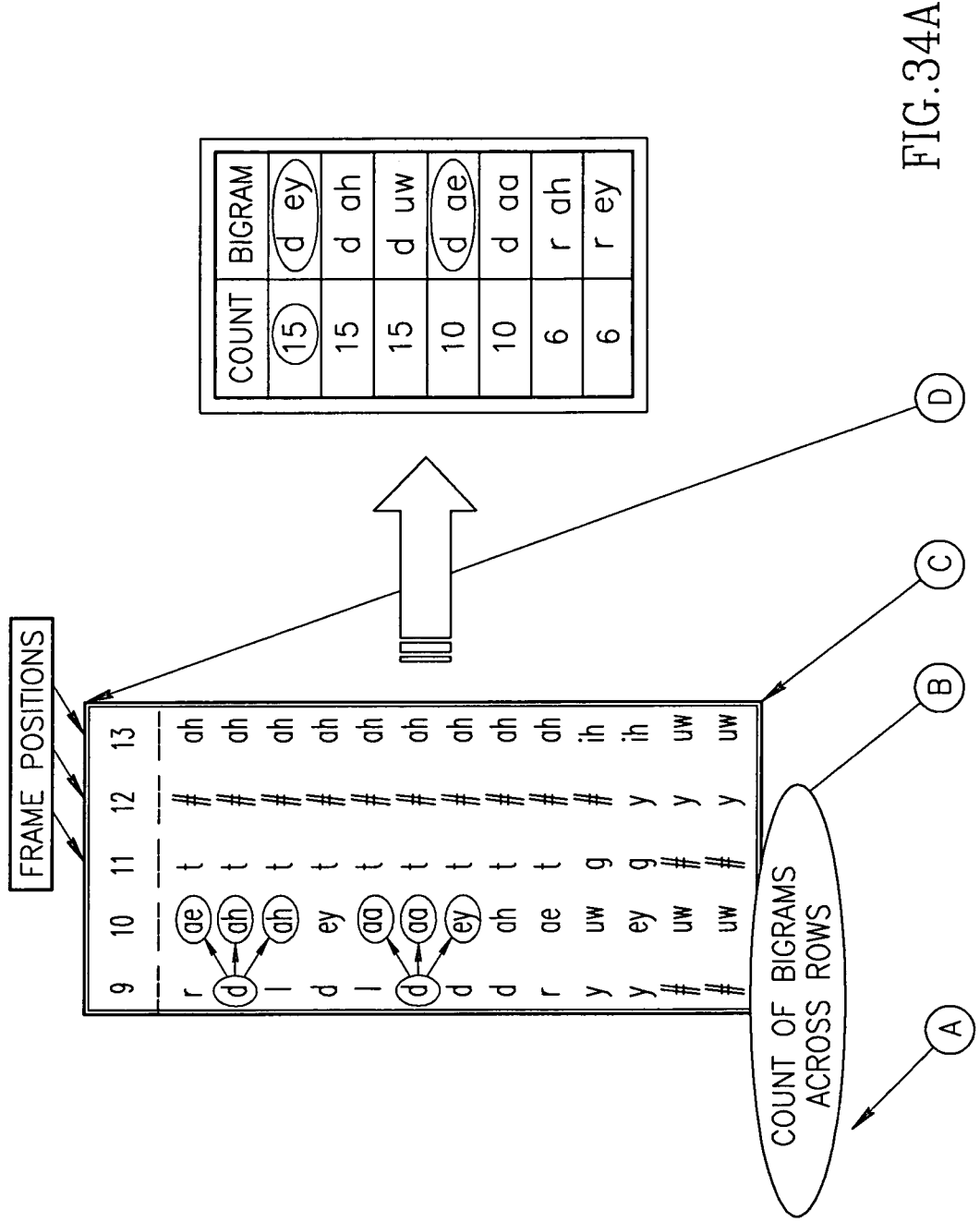
FIG. 34 is a diagram showing a process for generating the positional phoneme-bigram modeling table of FIG. 33.
Figure 34B:
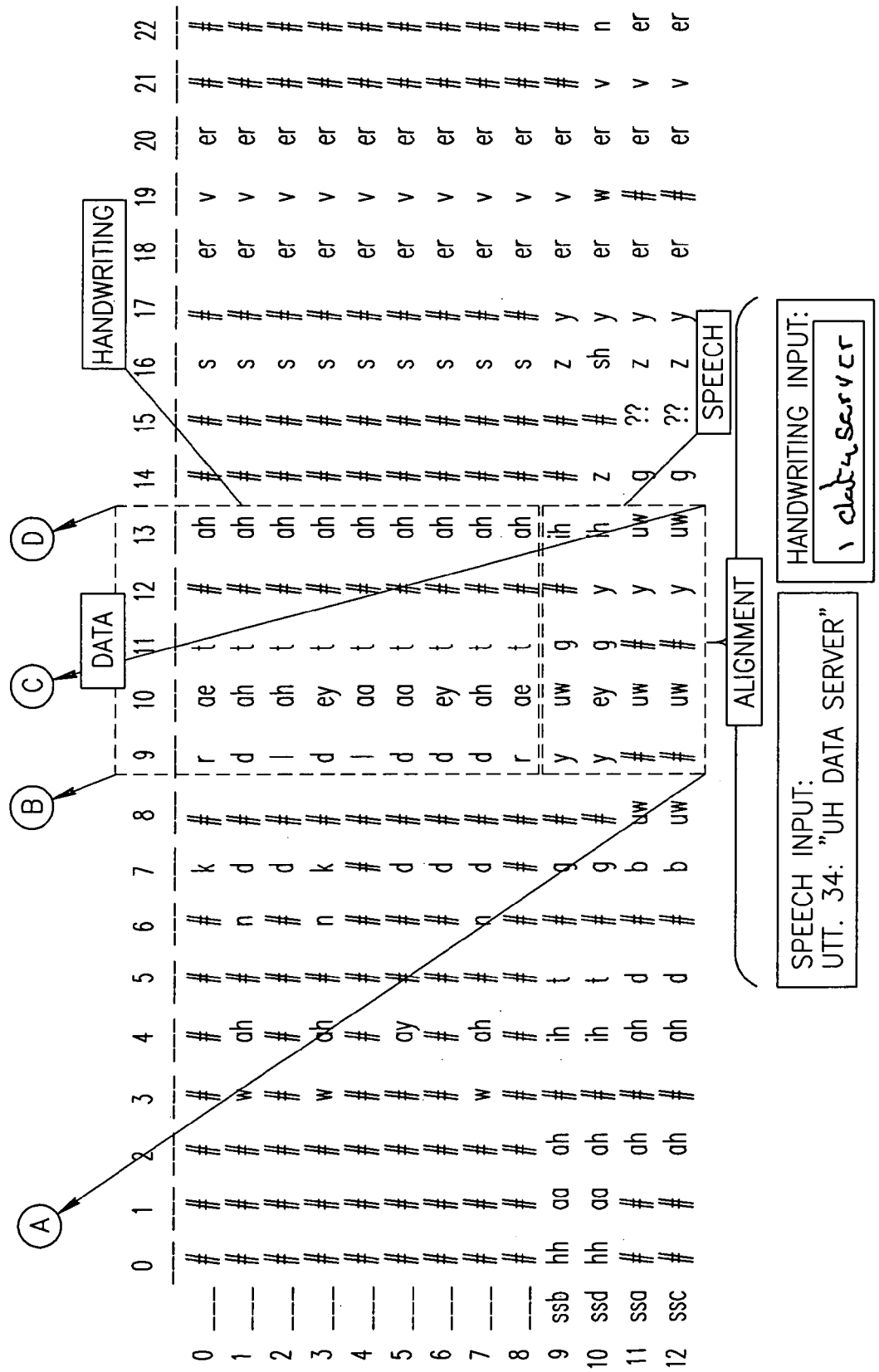

To consolidate the phoneme sequence information available from both the speech and handwriting input streams, the system 500 utilizes a technique referred to as Positional Phoneme-Bigram Modeling, which was summarily described above. FIGS. 34 and 35 together give an example of positional phoneme bigram modeling. For the alignment matrix shown in FIG. 33, a user or presenter spoke the phrase "and/or one . . . uh data server." The spoken phrase was segmented into two short utterances. And, as the user spoke this phrase, he/she also wrote the term 1 dataserver on an ink-sensitive surface (not shown).

For example, it has been found that handwriting overlaps temporally with spoken phrases to which they should be aligned. If a single instance of handwriting overlaps an earlier-starting spoken utterance and a later-finishing spoken utterance, then the two utterances could be treated as one for the purpose of alignment with handwriting to discover any redundancy. FIG. 33 shows the second spoken utterance is aligned with the handwriting, so there is a partial mismatch between the aligned speech and handwriting. The handwriting section of the alignment is shown in the upper row blocks and represents the phonemetic letter-to-sound-generated sequence from the handwritten term, "one data server." The speech phoneme sequences are shown in the lower row blocksand represent the utterance, "uh data server."

In FIG. 34 another alignment matrix for this same combination is shown. Recall that many such matrices are constructed and/or used during processing, because their alignments vary depending on the first or seed phoneme sequence. Phoneme bigram counts are collected from all alignment matrices for a given attempt at handwriting and speech integration. In the illustrated embodiment, the area that corresponds to the word data shows a likelihood of how the word data was pronounced (e.g., either d ae t ah or d ey t ah). The dynamic positional phoneme bigram counts bigrams across rows, as shown in the enlarged box on the upper-left side of the illustrated embodiment. This results in bigram counts like those shown in the right-side count/bigram table, where in comparing between d ey t ah and/or d ae t ah the former is more likely based on phoneme sequence information extracted from this matrix. In addition to the equations described below, FIG. 34 shows one embodiment of how positional phoneme-bigram modeling may work. As shown in the box on the upper-left, phoneme sequences are counted across rows in the alignment matrix. These counts are then used to weight second-pass phoneme recognition over saved speech features. For example, given the phoneme-bigrams available in this alignment matrix for the word data, the d ey t ah pronunciation appears more likely than the d ae t ah pronunciation. This is shown in count/bigram table in the upper-right.

FIG. 35 shows two equations that may be utilized to compute the positional bigram counts. Equation 1 states that for each phoneme (p), which is a member of the phoneme set (P), and/or for each frame position (j) from 0 to the number of columns (c) in the alignment matrix, the count of bigram (p1,p2) at frame/column position j (i.e., $ct(j,p1,p2)$) is summed over all occurrences of p1 in the i'th row (i from 0 to the number of rows, r, in the matrix) and/or p2 in k'th row of the l'th column such that neither p1 nor p2 is silence (s=silence). Note that l ranges from j+l to cns, where the ns subscript means the nearest column with a non-silence phoneme. The notation $p(i,j)$ denotes the phoneme at the i'th row and/or j'th column of the matrix. The handling of silence in bigrams at the beginning and/or end of each matrix row is not shown, and/or otherwise silence is not allowed be part of a bigram. Thus in Equation 1, if a phoneme is silenced (s) then it is not considered, and/or the bigram in which it is participating does not add to the bigram count. Positional information, j, keeps track of the start frame of the bigram's first phoneme (which is computed from the average start frames of the phoneme sub-unit recognizers. This is used to constrain the bigram not to be used beyond a threshold of distance from its start position. It may be appreciated that bigrams from the end of an alignment segment may not be appropriate to use near the beginning of an alignment segment.

As mentioned earlier, the effect of using the positional phoneme bigram model during second pass phoneme recognition is analogous to that of using a word-level language model to constrain the acoustic choices made by a speech recognizer. In both cases the sequence model biases the scores of known or frequently encountered sequences to be higher than the scores of those sequences that are unknown or have not occurred frequently in the data on which the model was trained. The positional phoneme bigram model holds combined information from (1) the phoneme ensemble, (2) the handwriting letter-to-sound transformations, (3) the lattice extractions and/or possibly also from (4) exact transcript matches. These constraints on phoneme sequencing then interact with the actual acoustics of a spoken utterance. Second pass recognition, using the positional phoneme bigram-model, yielded the correct pronunciation (e.g., F R EH D G R IY N). In the refined, second-pass pronunciation there was no incorrectly inserted a possessive (s) between Fred and/or Green.

As discussed above, the system 500 three main functionalities: (1) alignment, (2) refinement, and (3) integration. The previous sections discussed alignment and refinement; whereas the process of integration is described in more detail herein. Integration uses a refined pronunciation as an integration decision metric against which to compare other inputs, and then decide on a best combination of spelling, pronunciation and/or semantics.

There are a number of information sources across which comparisons are made: (1) handwriting letter-strings and/or their phoneme sequences, (2) word-level transcripts, (3) word-level lattices, (4) word/phrase-spotter recognitions, (5) ensemble phoneme-level recognitions, and optionally sketch/chart recognition. The sixth input provides context in which combinations of the other five input sources are interpreted.

Comparisons across the above-identified information sources provide different perspectives on confidence, or alternatively different confidence thresholds by which the information may be comparatively related. To combine information from different input sources, the system 500 in one embodiment performs the following steps, as follows: (1) determine which handwriting alternative's letter-to-sound phoneme sequence (handwriting-letter-to-sound alt) is closest pronunciation-wise to the group of first-pass ensemble phoneme sequences; (2) determine which (handwriting-letter-to-sound alt) is closest to the group of second-pass phoneme sequences; (3) compare, across both spelling and/or pronunciation, each pair of handwriting alternative and/or first-pass speech output, and/or then each pair of handwriting alternative and/or second-pass speech output; the scores of these pair-wise comparisons are a sum of the handwriting recognizer score, the speech recognizer score, and/or the normalized scores of the phoneme and/or letter alignment comparisons for each pair; and during the final scoring of combined information sources, normalized phoneme alignment comparison scores are an average per-phoneme score based on the number of phonemes in the speech segment to which the handwriting is being compared, if all phonemes in the speech are matched then the score may be 1.0, which indicates a perfect match; an alignment with insertion and/or/or deletion errors will reduce the normalized match score, thus if there are more errors (e.g., substitutions, insertions or deletions) than correct matches then the normalized match score may be close to or equal to zero; normalized letter alignment comparisons are treated similarly; (4) if there exist combinations of handwriting alternatives and/or lattice word sequences, then those with (i) a high enough phoneme coherence, (ii) letter alignment score, and/or (iii) phoneme alignment score are examined and/or added to the list possible combinations; there is no actual handwriting recognition score for word sequences extracted from the lattice; thus handwriting recognition scores cannot be factored into the probability for such combinations; thus the score of the lattice comparisons must be artificially scaled with respect to other combinations that do include handwriting recognition scores; since the existence of high-scoring lattice sequences is on its own strong evidence of what the pronunciation should be, the lattice combinations are correspondingly biased to rank at the top of the list of comparisons across all information sources; (5) if, for a given utterance, there is a Word/Phrase-Spotter recognition then that is taken into account as strong evidence of what the spelling of the handwritten word should be; (6) if there is no Word/Phrase-Spotter recognition and/or no exact or near exact matches across the handwriting/lattice comparisons, then a determination from either (a) the hand writing/first-pass-speech, (b) hand writing/second-pass-speech or (c) hand writing/lattice comparisons is made as to what the most likely spelling and/or pronunciation ought to be. Information from the above 1st-pass-closest-handwriting and/or 2nd-pass-closest-handwriting is used in making this decision, to determine how much confidence to place in (a) and/or (b); (7) if any combination group ranks high enough compared to the others then its ranked and/or scored pairs are used to decide which handwriting alternative to use as a basis for the spelling; and (8) if no combination group ranks high enough then all combinations are sorted and/or the best scoring pair becomes the basis for creating the list of alternate spellings and/or pronunciations.

One outcome of the alignment-based integration process are output messages from the master speech recognizer, like those shown in FIG. 36. The score listed for these examples is actually that of the most coherence alignment matrix for the redundant inputs involved in the new word discovery. These messages are routed back to the multiparser 528 for both enrollment and inclusion in the displayed chart. In one embodiment, the system 500 may employ stochastic pattern recognition approaches—like neural nets, maximum entropy models or conditional random fields—to model the combination of variously weighted information under all the various conditions of integration and to generate an integration decision metric. One purpose of an integration decision metric is to select an appropriate group of inputs from which the final spelling and/or pronunciation should be taken, and then function as metric against which the final combinations may be scored.

Figure 37:
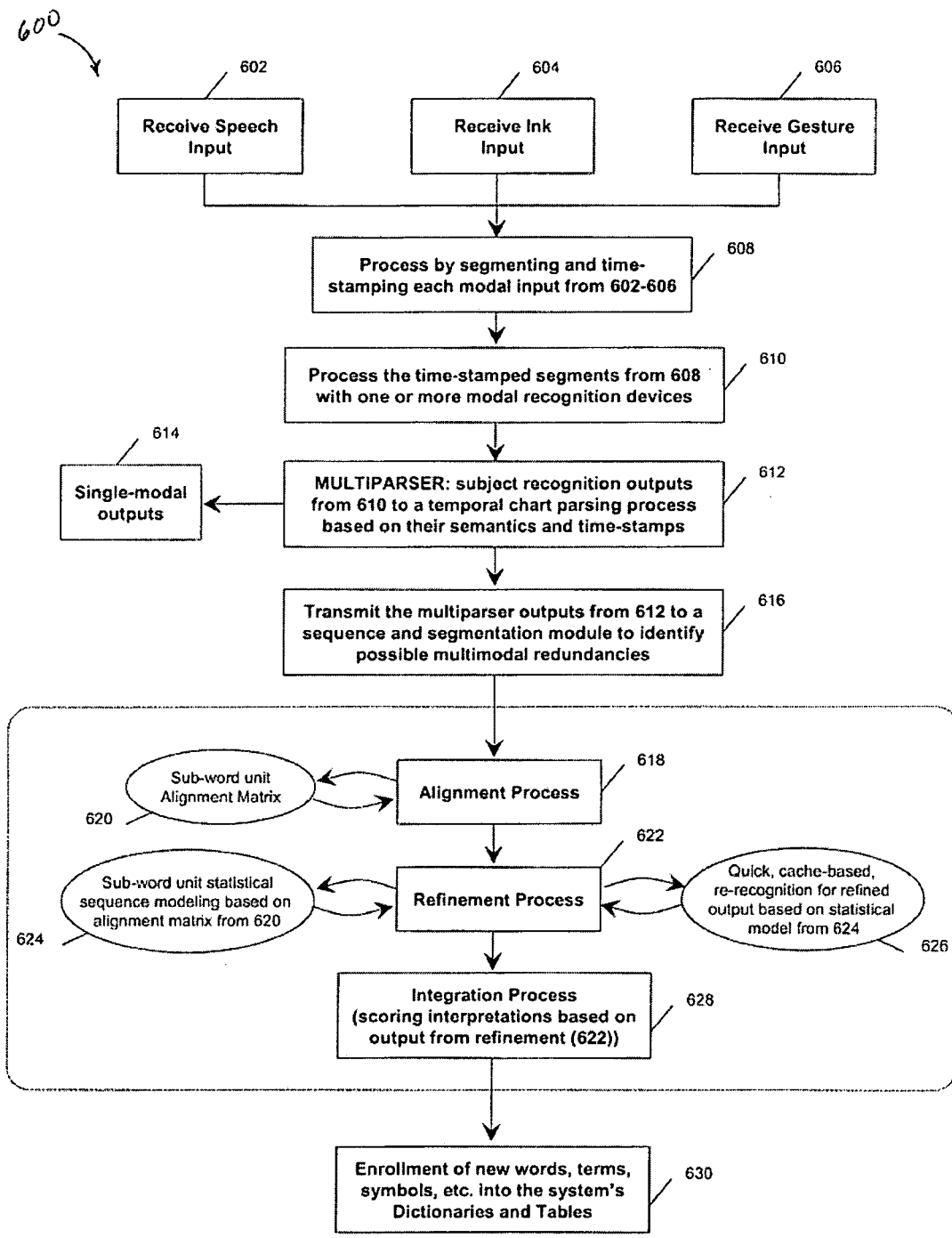
FIG. 37 is a flowchart showing a method 600 of receiving, recognizing, processing, and comparing features of speech, written and/or gesture input into the system of FIG. 5.

FIG. 37 is a flowchart showing a method 600 of receiving speech input 602, receiving ink (sketched or written) input 604 and optionally receiving gesture input 606, each input representative of a communication mode (i.e., modal inputs). In turn at step 608, one or more of the modal inputs 602, 604, 606 are processed by segmenting and time-stamping each modal input to generate a number of time-stamped segments having information from one or more of the modal inputs. At step 610, the time-stamped segments are processed with one or more modal recognition devices or recognizers. At step 612, outputs from the modal recognizers are subjected to a chart parsing process based on semantic features and the time stamps associated with the outputs from the modal recognizes. Optionally, if only one modal input (e.g., speech, writing, or gestures) are processed then the multiparser may identify such as a single modal output as indicated in step 614. At step 616, the multiparser outputs are transmitted to a sequence and segmentation module for identifying possible multimodal redundancies.

Once a multimodal redundancy is detected, the redundancy is subjected to an alignment process 618, a refinement process 622, and an integration process 624, where each of the aforementioned process are described above in substantial detail and thus will not be re-described herein for purposes of brevity. At step 620, the alignment process produces a sub-word unit alignment matrix. At step 624, a sub-word statistical sequence modeling process is performed on the alignment matrix from step 620. In addition, at step 626, a cache-based, re-recognition process may be employed to refine and narrow in on a best-fit term or symbol corresponding to the multimodal redundancy. In one embodiment, the cache-based, re-recognition process uses a sub-word statistical sequence model developed during step 624. Lastly, at step 630, the system enrolls (i.e., learns) new words, terms, symbols, or other some other form of language representation and then stores the same in a predetermined database, dictionary, table, or the equivalent for access later on by the system.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for recognizing and evaluating possible relationships between terms expressed during cross-communication activities, the system comprising:
   a memory;
   a processor in signal communication with the memory;
   a speech recognition system having a speech collection device arranged to receive an ambiguously delimited speech signal and then transcribe the speech signal to a first plurality of sequences of articulatory features related to a portion of the speech signal;
   an ink segmentation and recognition system having an ink input receiving device configured to receive an ambiguously delimited digital ink input while the speech recognition system receives the speech portion, the ink segmentation and recognition system further configured to segment ink input that constitutes sketches from those that constitutes handwriting and then identify a second plurality of sequences of articulatory features related to the handwriting; and
   a multimodal fusion engine in signal communication with the processor, the multimodal fusion engine having a search alignment system configured to substantially align the articulatory features derived from the ambiguously delimited speech signal and the ambiguously delimited ink input using a coherence measure across articulatory features representations of the ambiguous inputs as between a candidate portion of the speech signal a candidate portion of the ink input.

2. The system of claim 1, wherein the speech collection device includes at least one microphone.

3. The system of claim 1, wherein the alignment system aligns the articulatory features based on a temporal relationship that includes a multimodal redundant relationship having a detected temporal boundary.

4. The system of claim 3, wherein the temporal boundary includes the speech portion and ink input being received by the system approximately close in time.

5. The system of claim 3, wherein the temporal boundary includes the speech portion and ink input being received contemporaneously.

6. The system of claim 1, wherein the ink input includes alphanumeric characters and non-alphanumeric symbols.

7. The system of claim 6, wherein the non-alphanumeric symbols include Unicode symbols.

8. The system of claim 1, wherein the alignment system includes a salience-weighted articulatory-feature comparison module for generating a table having pairs of hypothesized phonemes determined from at least one articulatory feature detected by the speech recognition system.

9. The system of claim 1, wherein the ink input includes pictorial and graphical sketches and symbols.

10. The system of claim 1, further comprising a refinement system in communication with the alignment system for dynamically modeling the articulatory features captured in the alignment matrix by identifying a desired path within the alignment matrix and then modifying the desired path based on temporal boundaries associated with the first and second communication modes.

11. The system of claim 1, wherein the ink collection device includes a digitizing pen.

12. The system of claim 1, further comprising a physical gesture capturing device having at least one sensor in communication with the system.

13. A method for recognizing and evaluating possible relationships between terms expressed during multiple communication modes, the method comprising:
    detecting at least two ambiguously delimited modes of communication selected from the group consisting of speech, handwriting, sketches, and physical gestures;
    receiving at least two of the ambiguously delimited modes of communication within a memory of a computational processing system;
    determining a time period between a first communication mode and a second communication mode to check for a multimodal redundancy;
    within the time period, aligning a plurality of articulatory features of the first communication mode with a plurality of articulatory features of the second communication mode using a coherence measure across the ambiguously delimited articulatory features of the first and second communication modes;
    generating a group of hypothesized redundant terms based on the time period and based on the plurality of articulatory features of the first and second communication modes;
    reducing a number of the hypothesized redundant terms to populate a matrix of possibly related sub-word units from which a best-fit term is to be selected; and
    determining the multimodal redundancy by selecting the best-fit term based at least in part on the coherence measure of the alignment of the first and second communication modes.

14. The method of claim 13, further comprising reducing the number of the hypothesized redundant terms through alignment, refinement, and integration processes.

15. The method of claim 13, further comprising dynamically enrolling the best-fit term into a lexical database.

16. The method of claim 13, wherein reducing the number of the hypothesized redundant terms includes generating a table of salience-weighted articulatory-features that ranks an important of the various articulatory features in comparing at least the first communication mode to the second communication mode.

17. The system of claim 10, further comprising an integration system in communication with the refinement system to select a desired term that is estimated to be a best-fit to the aligned articulatory features.

18. The system of claim 17, wherein the integration system is configured to generate a normalized match score based on information received at least from the alignment system and the refinement system.

* * * * *